(12) United States Patent
Qian et al.

(10) Patent No.: US 10,838,596 B2
(45) Date of Patent: Nov. 17, 2020

(54) TASK SWITCHING METHOD AND TERMINAL

(71) Applicant: HUAWEI TECHNOLOGIES CO., LTD., Shenzhen (CN)

(72) Inventors: Kai Qian, Beijing (CN); Liwei Huang, Beijing (CN); Zhenyu Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/651,644

(22) PCT Filed: Sep. 30, 2017

(86) PCT No.: PCT/CN2017/105064
§ 371 (c)(1),
(2) Date: Mar. 27, 2020

(87) PCT Pub. No.: WO2019/061512
PCT Pub. Date: Apr. 4, 2019

(65) Prior Publication Data
US 2020/0233551 A1 Jul. 23, 2020

(51) Int. Cl.
*G06F 3/0484* (2013.01)
*G06F 3/0488* (2013.01)

(52) U.S. Cl.
CPC ........ *G06F 3/0484* (2013.01); *G06F 3/04883* (2013.01); *G06F 3/04886* (2013.01)

(58) Field of Classification Search
CPC .. G06F 3/04883; G06F 21/44; G06F 3/04815; G06F 3/04845; G06F 3/0482;

(Continued)

(56) References Cited

U.S. PATENT DOCUMENTS

2005/0012723 A1* 1/2005 Pallakoff ............... G06F 1/1618
345/173
2010/0013780 A1* 1/2010 Ikeda .................. G06F 3/04883
345/173

(Continued)

FOREIGN PATENT DOCUMENTS

CN 103106039 A 5/2013
CN 103543948 A 1/2014

(Continued)

OTHER PUBLICATIONS

International Search Report dated Jun. 21, 2018, issued in counterpart Application No. PCT/CN2017/105064, with English Translation. (11 pages).

(Continued)

*Primary Examiner* — Toan H Vu
(74) *Attorney, Agent, or Firm* — Westerman, Hattori, Daniels & Adrian, LLP

(57) ABSTRACT

A task switching method is disclosed, which includes: displaying, by a terminal with a sensor installed on a side edge, a first interface in response to a pressing operation of a user on the side edge; displaying a first task window in a preset manner in response to the sliding operation; and displaying a second interface in response to detecting that the sliding operation is ended and that the finger of the user leaves the side edge, where the second interface is an interface of a task corresponding to the first task window displayed by the terminal in the preset manner when the sliding operation is ended and the finger of the user leaves the side edge.

19 Claims, 26 Drawing Sheets

(58) Field of Classification Search
CPC .. G06F 3/0488; G06F 3/04886; A61M 1/1698
See application file for complete search history.

(56) References Cited

U.S. PATENT DOCUMENTS

| | | | |
|---|---|---|---|
| 2012/0306788 A1* | 12/2012 | Chen | G06F 3/04886 345/173 |
| 2014/0059460 A1* | 2/2014 | Ho | G06F 3/0488 715/766 |
| 2014/0195935 A1 | 7/2014 | Yokoyama et al. | |
| 2014/0304646 A1* | 10/2014 | Rossmann | G06F 3/0482 715/790 |
| 2015/0192989 A1* | 7/2015 | Kim | G06F 3/0485 345/156 |
| 2015/0227274 A1 | 8/2015 | Lee et al. | |
| 2015/0242077 A1 | 8/2015 | Li et al. | |
| 2015/0248545 A1* | 9/2015 | Al-Jamal | H04M 1/67 345/173 |
| 2016/0294750 A1* | 10/2016 | Ansari | G06F 3/04845 |
| 2016/0357368 A1* | 12/2016 | Federighi | G06F 3/04815 |
| 2017/0242993 A1* | 8/2017 | Hama | G06F 21/44 |
| 2018/0335937 A1* | 11/2018 | Hauenstein | G06F 3/04883 |
| 2018/0344918 A1* | 12/2018 | Turner | A61M 1/1698 |

FOREIGN PATENT DOCUMENTS

| | | |
|---|---|---|
| CN | 103809891 A | 5/2014 |
| CN | 104267902 A | 1/2015 |
| CN | 104731499 A | 6/2015 |
| CN | 104765446 A | 7/2015 |
| CN | 104991819 A | 10/2015 |
| CN | 106020796 A | 10/2016 |
| CN | 107045420 A | 8/2017 |
| CN | 107193436 A | 9/2017 |
| KR | 20170078004 A | 7/2017 |

OTHER PUBLICATIONS

Extended (Supplementary) European Search Report dated Aug. 14, 2020, issued in counterpart EP Application No. 17926387.6. (8 pages).

Office Action dated Sep. 2, 2020, issued in counterpart CN Application No. 201780091583.5, with English Translation. (38 pages).

* cited by examiner

TASK SWITCHING METHOD AND TERMINAL

CROSS-REFERENCE TO RELATED APPLICATIONS

This application is a national stage of International Application No. PCT/CN2017/105064, which filed on Sep. 30, 2017, which is hereby incorporated by reference in its entirety.

TECHNICAL FIELD

This application relates to the field of electronic technologies, and in particular, to a task switching method and a terminal.

BACKGROUND

With the popularity of mobile terminals, improvement of performance of the mobile terminals, and increase of storage space of the mobile terminals, more applications may be installed in the mobile terminals. A mobile terminal may start a plurality of applications simultaneously. When the mobile terminal currently displays an interface of one application (application a) in the plurality of applications, other applications in the plurality of applications may run on a background of the mobile terminal. A user may control the mobile terminal to switch between interfaces of the plurality of applications.

For example, in response to a tapping operation of the user on a Home key or a Back key, the mobile terminal may exit the interface of the application a, and return to a home interface of the mobile terminal; and then in response to a tapping operation of the user on an icon of another application that is displayed on the main desktop, display an interface of an application (that is, a target application) selected by the user, to implement application switching. However, there is a problem that operations for implementing application switching, for example, tapping the Home key or the Back key to return to the main desktop and then searching for the target application on the main desktop, are complex and that human-machine interaction performance is relatively poor.

SUMMARY

This application provides a task switching method and a terminal to reduce user operations in application switching, improve human-machine interaction performance, and improve user experience.

According to a first aspect, this application provides a task switching method, where the method may be applied to a terminal, a sensor is installed on a side edge of the terminal, the sensor is configured to detect an operation of a user on the side edge, and the method includes: displaying, by the terminal in response to a pressing operation of the user on the side edge, a first interface including at least one task window, where the at least one task window corresponds to at least one task recently run by the terminal and not closed; detecting, by the terminal, a sliding operation of the user on the side edge, where the sliding operation and the pressing operation are continuous operations of a finger of the user without leaving the side edge; displaying, by the terminal, a first task window in a preset manner in response to the sliding operation, where the first task window is one of the at least one task window, and as a sliding position of the sliding operation changes, when the at least one task window includes a plurality of task windows, the first task window displayed in the preset manner is switched in the plurality of task windows; and displaying, by the terminal, a second interface in response to detecting that the sliding operation is ended and that the finger of the user leaves the side edge, where the second interface is an interface of a task corresponding to the first task window displayed by the terminal in the preset manner when the sliding operation is ended and the finger of the user leaves the side edge.

In this application, the terminal may implement functions of "displaying a multi-task interface" and "selecting a task window from the multi-task interface for performing application switching" in response to the pressing operation and the sliding operation that are continuous operations of the finger without leaving the side edge, and the user does not need to perform operations at least twice in different positions of a mobile phone. According to this application, user operations in application switching can be reduced, human-machine interaction performance can be improved, and user experience can be improved.

In a possible embodiment, the at least one task recently run by the terminal and not closed includes at least one application recently run by the terminal and not closed; correspondingly, the first task window is a task window of one of the at least one application recently run by the terminal and not closed; and the second interface is an interface of an application corresponding to the first task window displayed by the terminal in the preset manner when the sliding operation is ended and the finger of the user leaves the side edge.

In this application, regardless of whether the terminal currently displays a desktop of the terminal or an interface of a first application (that is, any application of the terminal), and regardless of one or more applications recently run by the terminal and not closed, the terminal may display, in response to the pressing operation, the first interface including a task window of the at least one application recently run by the terminal and not closed. To be specific, in this application, the terminal may implement switching between applications in response to the pressing operation and the sliding operation that are continuous operations of the finger without leaving the side edge. This can reduce user operations in application switching, improve human-machine interaction performance, and improve user experience.

In another possible design method, when there are at least two applications recently run by the terminal and not closed, the at least one task window in the first interface is task windows of the at least two applications; or when an application recently run by the terminal and not closed includes only a first application, the at least one task window in the first interface is a task window of an application task in the first application, where the first application in this application is an application that is being run by the terminal when the terminal responds to the pressing operation.

Specifically, the displaying, by the terminal, a first interface in response to a pressing operation of the user on the side edge may include: when there are at least two applications recently run by the terminal and not closed, displaying, by the terminal in response to the pressing operation of the user on the side edge, the first interface including task windows of the at least two applications, where correspondingly, the first task window is a task window of one of the at least two applications; and the second interface is an interface of an application corresponding to the first task window displayed by the terminal in the preset manner when the sliding operation is ended and the finger of the user leaves the side edge.

The displaying, by the terminal, a first interface in response to a pressing operation of the user on the side edge may further include: when an application recently run by the terminal and not closed includes only a first application, displaying, by the terminal in response to the pressing operation of the user on the side edge, the first interface including a task window of one or more application tasks in the first application, where the first application is any application in the terminal, where correspondingly, the first task window is a task window of an application task in the first application; and the second interface is an interface of an application task corresponding to the first task window displayed by the terminal in the preset manner when the sliding operation is ended and the finger of the user leaves the side edge.

In this application, the terminal may not only implement switching between applications in response to the pressing operation and the sliding operation that are continuous operations of the finger without leaving the side edge, but also implement switching between a plurality of application tasks in one application. To be specific, according to this application, user operations in switching between application tasks of one application can also be reduced, human-machine interaction performance can be improved, and user experience can be improved.

In another possible design method, the terminal may determine, by using an interface currently displayed by the terminal, whether to display task windows of a plurality of applications in the first interface or display task windows of a plurality of application tasks in a first application. For example, when the terminal currently displays a desktop of the terminal, the terminal displays task windows of a plurality of applications in the first interface.

Specifically, the displaying, by the terminal, a first interface in response to a pressing operation of the user on the side edge may include: when the terminal currently displays a desktop of the terminal, displaying, by the terminal in response to the pressing operation of the user on the side edge, the first interface including a task window of the at least one application recently run by the terminal and not closed, where the first task window is the task window of the one of the at least one application recently run by the terminal and not closed; and the second interface is the interface of the application corresponding to the first task window displayed by the terminal in the preset manner when the sliding operation is ended and the finger of the user leaves the side edge.

In this application, when the terminal currently displays the desktop of the terminal, the terminal may display, in response to the pressing operation of the user on the side edge, the first interface including a task window of one or more applications; and then the terminal may implement switching between applications in response to the sliding operation, where the pressing operation and the sliding operation are continuous operations of the finger without leaving the side edge. To be specific, according to this application, user operations in application switching can be reduced, human-machine interaction performance can be improved, and user experience can be improved.

In another possible design method, the terminal may determine, based on a position of the pressing operation on the side edge of the terminal, whether to display task windows of a plurality of applications in the first interface or display task windows of a plurality of application tasks in a first application.

Specifically, when the pressing operation is a pressing operation of the user in a first position on the side edge, the at least one task window in the first interface is a task window of one or more applications recently run by the terminal and not closed; or when the pressing operation is a pressing operation of the user in a second position on the side edge, the at least one task window in the first interface is a task window of one or more application tasks of the first application. The first position and the second position in this application may be two different positions on a same side edge of the terminal. Alternatively, the first position and the second position may be located on two different side edges of the terminal.

The displaying, by the terminal, a first interface in response to a pressing operation of the user on the side edge may include: when the pressing operation is a pressing operation of the user in the first position on the side edge, displaying, by the terminal in response to the pressing operation of the user on the side edge, the first interface including the task window of the at least one application recently run by the terminal and not closed; or when the pressing operation is a pressing operation of the user in the second position on the side edge, displaying, by the terminal in response to the pressing operation of the user on the side edge, the first interface including a task window of an application task in a second application, where the second application is a last application after the at least one application recently run by the terminal and not closed is arranged in ascending order of runtime, where correspondingly, the first task window is a task window of an application task in the second application; and the second interface is an interface of an application task corresponding to the first task window displayed by the terminal in the preset manner when the sliding operation is ended and the finger of the user leaves the side edge.

In this application, the terminal may determine, based on the position of the pressing operation, whether the pressing operation is used to instruct the terminal to display a multi-task interface of a plurality of applications or display a multi-task interface of a plurality of application tasks of one application. In this way, the terminal can not only implement switching between applications in response to the pressing operation and the sliding operation that are continuous operations of the finger without leaving the side edge, but also implement switching between a plurality of application tasks in one application. To be specific, according to this application, user operations in switching between application tasks of one application can also be reduced, human-machine interaction performance can be improved, and user experience can be improved.

In another possible design method, the side edge includes a left side edge of the terminal and/or a right side edge of the terminal. It may be understood that, the sensor may be disposed in a position that is on the side edge of the terminal and facilitates a user operation when the user holds the terminal. A specific position of the sensor on the side edge of the terminal is not limited in this application. In addition, the side edge in this application may be not only the left side edge and/or the right side edge of the terminal, but also an upper side edge and/or a lower side edge of the terminal. This is not limited in this application.

In another possible design method, to avoid an unintentional operation of the user, the pressing operation may be a pressing operation of the user on at least two points of the side edge. Specifically, the displaying, by the terminal, a first interface in response to a pressing operation of the user on the side edge may include: displaying, by the terminal, the first interface in response to a pressing operation of the user on at least two points of the side edge.

The pressing operation of the user on at least two points of the side edge may be a pressing operation of the user on at least two fixed points of a same side edge of the terminal. Alternatively, the pressing operation of the user on at least two points of the side edge may be a pressing operation of the user on at least two points of different side edges of the terminal.

According to a second aspect, this application provides a terminal, where a sensor is installed on a side edge of the terminal, and the terminal includes: a detection unit, a processing unit, and a display unit, where the detection unit is configured to detect an operation of a user on the side edge of the terminal by using the sensor; the processing unit is configured to run at least one task in the terminal; the display unit is configured to display a first interface in response to a pressing operation that is of the user on the side edge and is detected by the detection unit, where the first interface includes at least one task window, and the at least one task window corresponds to at least one task recently run by the processing unit and not closed; the detection unit is further configured to detect a sliding operation of the user on the side edge, where the sliding operation and the pressing operation are continuous operations of a finger of the user without leaving the side edge; the display unit is further configured to display a first task window in a preset manner in response to the sliding operation detected by the detection unit, where the first task window is one of the at least one task window, and as a sliding position of the sliding operation changes, when the at least one task window includes a plurality of task windows, the first task window displayed in the preset manner is switched in the plurality of task windows; and the display unit is further configured to display a second interface in response to detecting, by the detection unit, that the sliding operation is ended and that the finger of the user leaves the side edge, where the second interface is an interface of a task corresponding to the first task window displayed by the terminal in the preset manner when the sliding operation is ended and the finger of the user leaves the side edge.

In a possible design method, the at least one task recently run by the processing unit and not closed includes at least one application recently run by the terminal and not closed; the first task window displayed by the display unit is a task window of one of the at least one application recently run by the processing unit and not closed; and the second interface displayed by the display unit is an interface of an application corresponding to the first task window displayed in the preset manner when the sliding operation is ended and the finger of the user leaves the side edge.

In another possible design method, the display unit is specifically configured to: when there are at least two applications recently run by the processing unit and not closed, display, in response to the pressing operation of the user on the side edge, the first interface including task windows of the at least two applications, where the first task window is a task window of one of the at least two applications; and the second interface is an interface of an application corresponding to the first task window displayed by the display unit in the preset manner when the sliding operation is ended and the finger of the user leaves the side edge.

In another possible design method, the display unit is specifically configured to: when an application recently run by the processing unit and not closed includes only a first application, display, in response to the pressing operation of the user on the side edge, the first interface including a task window of one or more application tasks in the first application, where the first application is any application in the terminal, where the first task window is a task window of an application task in the first application; and the second interface is an interface of an application task corresponding to the first task window displayed by the display unit in the preset manner when the sliding operation is ended and the finger of the user leaves the side edge.

In another possible design method, the display unit is specifically configured to: when the display unit currently displays a desktop of the terminal, display, in response to the pressing operation of the user on the side edge, the first interface including a task window of the at least one application recently run by the processing unit and not closed, where the first task window is the task window of the one of the at least one application recently run by the terminal and not closed; and the second interface is the interface of the application corresponding to the first task window displayed by the display unit in the preset manner when the sliding operation is ended and the finger of the user leaves the side edge.

In another possible design method, the pressing operation is a pressing operation of the user in a first position on the side edge.

In another possible design method, the display unit is specifically configured to: when the pressing operation is a pressing operation of the user in a second position on the side edge, display, in response to the pressing operation of the user on the side edge, the first interface including a task window of an application task in a second application, where the second application is a last application after the at least one application recently run by the processing unit and not closed is arranged in ascending order of runtime, where the first task window is a task window of an application task in the second application; and the second interface is an interface of an application task corresponding to the first task window displayed by the display unit in the preset manner when the sliding operation is ended and the finger of the user leaves the side edge.

In another possible design method, the side edge includes a left side edge of the terminal and/or a right side edge of the terminal.

In another possible design method, the display unit is specifically configured to display the first interface in response to a pressing operation of the user on at least two points of the side edge.

According to a third aspect, this application provides a terminal, where the terminal includes a processor, a memory, a touchscreen, and a sensor installed on a side edge of the terminal, the memory, the touchscreen, and the sensor are coupled to the processor, the memory is configured to store computer program code, the computer program code includes a computer instruction, and when the processor executes the computer instruction, the sensor is configured to detect a pressing operation of a user on the side edge; the processor is further configured to run at least one task in the terminal, where data of the at least one task is stored in the memory; the touchscreen is configured to display a first interface in response to the pressing operation detected by the sensor, where the first interface includes at least one task window, and the at least one task window corresponds to at least one task recently run by the processor and not closed;

the sensor is further configured to detect a sliding operation of the user on the side edge, where the sliding operation and the pressing operation are continuous operations of a finger of the user without leaving the side edge; the touchscreen is further configured to display a first task window in a preset manner in response to the sliding operation detected by the sensor, where the first task window is one of the at least one task window, and as a sliding position of the sliding operation changes, when the at least one task window includes a plurality of task windows, the first task window displayed in the preset manner is switched in the plurality of task windows; the sensor is further configured to detect that the sliding operation is ended and that the finger of the user leaves the side edge; and the touchscreen is further configured to display a second interface in response to detecting, by the sensor, that the sliding operation is ended and that the finger of the user leaves the side edge, where the second interface is an interface of a task corresponding to the first task window displayed by the touchscreen in the preset manner when the sliding operation is ended and the finger of the user leaves the side edge.

In a possible design method, the at least one task recently run by the processor and not closed includes at least one application recently run by the processor and not closed; the first task window displayed by the touchscreen is a task window of one of the at least one application recently run by the processor and not closed; and the second interface displayed by the touchscreen is an interface of an application corresponding to the first task window displayed by the touchscreen in the preset manner when the sensor detects that the sliding operation is ended and that the finger of the user leaves the side edge.

In another possible design method, the touchscreen is specifically configured to: when there are at least two applications recently run by the processor and not closed, display, in response to the pressing operation detected by the sensor, the first interface including task windows of the at least two applications, where the first task window displayed by the touchscreen is a task window of one of the at least two applications; and the second interface displayed by the touchscreen is an interface of an application corresponding to the first task window displayed by the touchscreen in the preset manner when the sensor detects that the sliding operation is ended and that the finger of the user leaves the side edge.

In another possible design method, the touchscreen is specifically configured to: when an application recently run by the processor and not closed includes only a first application, display, in response to the pressing operation detected by the sensor, the first interface including a task window of one or more application tasks in the first application, where the first application is any application in the terminal, where the first task window displayed by the touchscreen is a task window of an application task in the first application; and the second interface displayed by the touchscreen is an interface of an application task corresponding to the first task window displayed by the touchscreen in the preset manner when the sliding operation is ended and the finger of the user leaves the side edge.

In another possible design method, the touchscreen is specifically configured to: when the touchscreen currently displays a desktop of the terminal, display, in response to the pressing operation detected by the sensor, the first interface including a task window of the at least one application recently run by the processor and not closed, where the first task window displayed by the touchscreen is the task window of the one of the at least one application recently run by the terminal and not closed; and the second interface displayed by the touchscreen is the interface of the application corresponding to the first task window displayed by the touchscreen in the preset manner when the sliding operation is ended and the finger of the user leaves the side edge.

In another possible design method, the pressing operation detected by the sensor is a pressing operation of the user in a first position on the side edge.

In another possible design method, the touchscreen is specifically configured to: when the pressing operation is a pressing operation of the user in a second position on the side edge, display, in response to the pressing operation detected by the sensor, the first interface including a task window of an application task in a second application, where the second application is a last application after the at least one application recently run by the processor and not closed is arranged in ascending order of runtime, where the first task window displayed by the touchscreen is a task window of an application task in the second application; and the second interface displayed by the touchscreen is an interface of an application task corresponding to the first task window displayed by the touchscreen in the preset manner when the sliding operation is ended and the finger of the user leaves the side edge.

In another possible design method, the side edge includes a left side edge of the terminal and/or a right side edge of the terminal.

In another possible design method, the touchscreen is specifically configured to display the first interface in response to a pressing operation that is of the user on at least two points of the side edge and is detected by the sensor.

According to a fourth aspect, this application provides a graphical user interface (GUI), where the graphical user interface is stored in a terminal, the terminal includes a touchscreen, a memory, a processor, and a sensor installed on a side edge of the terminal, the sensor is configured to detect an operation of a user on the side edge, and the processor is configured to execute one or more computer programs stored in the memory, where the graphical user interface includes: a first GUI displayed on the touchscreen in response to a pressing operation on the side edge, where the first GUI includes a first interface, the first interface includes at least one task window, and the at least one task window corresponds to at least one task recently run by the processor and not closed; a second GUI displayed on the touchscreen in response to a sliding operation on the side edge, where the sliding operation and the pressing operation are continuous operations of a finger of the user without leaving the side edge, a first task window is displayed in the second GUI in a preset manner, the first task window is one of the at least one task window, and as a sliding position of the sliding operation changes, when the at least one task window includes a plurality of task windows, the first task window displayed in the second GUI in the preset manner is switched in the plurality of task windows; and a third GUI displayed on the touchscreen in response to ending the sliding operation and leaving the side edge by the finger of the user, where the third GUI includes a second interface, and the second interface is an interface of a task corresponding to the first task window displayed in the second GUI in the preset manner when the sliding operation is ended and the finger of the user leaves the side edge.

In a possible design method, the first task window in the second GUI is a task window of one of at least one application recently run by the processor and not closed; and the second interface in the third GUI is an interface of an application corresponding to the first task window displayed in the second GUI in the preset manner when the sliding operation is ended and the finger of the user leaves the side edge.

In another possible design method, the first interface in the first GUI specifically includes task windows of at least two applications recently run by the processor and not closed; the first task window in the second GUI is a task window of one of the at least two applications; and the second interface in the third GUI is an interface of an application corresponding to the first task window displayed in the second GUI in the preset manner when the sliding operation is ended and the finger of the user leaves the side edge.

In another possible design method, when an application recently run by the processor and not closed includes only a first application, the first interface in the first GUI is specifically the first interface including a task window of one or more application tasks in the first application, and the first application is any application in the terminal, where the first task window in the second GUI is a task window of an application task in the first application; and the second interface in the third GUI is an interface of an application task corresponding to the first task window displayed in the second GUI in the preset manner when the sliding operation is ended and the finger of the user leaves the side edge.

In another possible design method, when the touchscreen displays a desktop of the terminal, the first interface in the first GUI displayed on the touchscreen in response to the pressing operation on the side edge includes a task window of the at least one application recently run by the processor and not closed, where the first task window in the second GUI is the task window of the one of the at least one application recently run by the terminal and not closed; and the second interface in the third GUI is the interface of the application corresponding to the first task window displayed in the second GUI in the preset manner when the sliding operation is ended and the finger of the user leaves the side edge.

In another possible design method, the pressing operation is a pressing operation of the user in a first position on the side edge.

In another possible design method, the first interface in the first GUI displayed on the touchscreen in response to a pressing operation in a second position on the side edge includes a task window of an application task in a second application, where the second application is a last application after the at least one application recently run by the touchscreen and not closed is arranged in ascending order of runtime, where the first task window in the second GUI is a task window of an application task in the second application; and the second interface in the third GUI is an interface of an application task corresponding to the first task window displayed in the second GUI in the preset manner when the sliding operation is ended and the finger of the user leaves the side edge.

According to a fifth aspect, this application provides a computer storage medium, where the computer storage medium includes a computer instruction, and when the computer instruction is run on a terminal, the terminal is enabled to perform the task switching method according to the first aspect or any possible design method of the first aspect.

According to a sixth aspect, this application provides a computer program product, where when the computer program product is run on a computer, the computer is enabled to perform the task switching method according to the first aspect and any possible design method of the first aspect.

It may be understood that, the terminals in the second aspect, or the third aspect, or the possible design methods thereof, the GUI in the fourth aspect, the computer storage medium in the fifth aspect, and the computer program product in the sixth aspect provided above are all configured to perform the corresponding methods provided above. Therefore, for beneficial effects that the terminals, the GUI, the computer storage medium, and the computer program product can achieve, refer to beneficial effects in the corresponding methods provided above. Details are not described again herein.

DESCRIPTION OF EMBODIMENTS

The terms "first" and "second" mentioned below are merely intended for description, and shall not be understood as an indication or implication of relative importance or an implicit indication of a quantity of indicated technical features. Therefore, a feature defined by "first" or "second" may explicitly or implicitly include one or more features. In the description of this application, unless otherwise stated, "a plurality of" means two or more than two.

Figure 1:
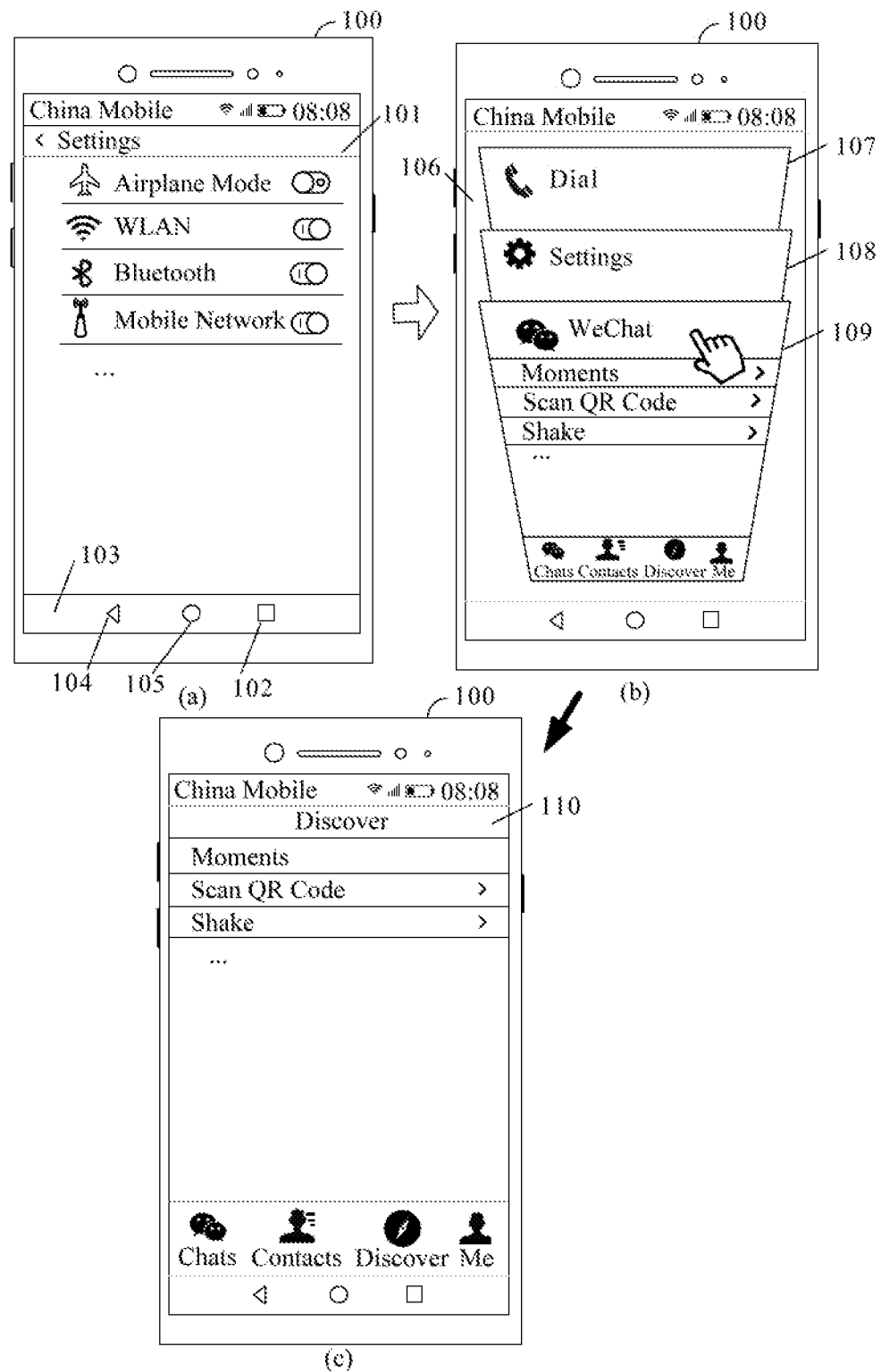
FIG. 1 is a schematic diagram 1 of an example of a display interface of a terminal according to an embodiment of this application.

Generally, in a process of implementing application switching by returning to a main desktop, user operations are complex, and human-machine interaction performance is relatively poor. To resolve this problem, using a mobile phone 100 shown in FIG. 1 as an example, a user may control, in the following manner, the mobile phone 100 to implement application switching:

It is assumed that the mobile phone 100 currently displays an interface 101 of a "Settings" application shown in (a) in FIG. 1, and that the mobile phone 100 recently run three application programs: the "Settings" application, a "Dial-Up" application, and a "WeChat" application. After the user taps a Recent (Recent) key 102 shown in (a) in FIG. 1, the mobile phone 100 may display, in response to the tapping operation of the user on the Recent key 102, a multi-task interface including a plurality of task windows.

For example, the mobile phone 100 displays a multi-task interface 106 shown in (b) in FIG. 1. The multi-task interface 106 includes a "Dial-Up" task window 107, a "Settings" task window 108, and a "WeChat" task window 109. Alternatively, the user may control, by double-tapping a Home key of the mobile phone, the multi-task interface shown in (b) in FIG. 1. Then, as shown in (b) in FIG. 1, after the user taps any task window (such as the "WeChat" task window 109) in the multi-task interface 106, the mobile phone 100 may display, in response to the selection operation of the user on the "WeChat" task window 109, an interface of the "WeChat" application corresponding to the "WeChat" task window 109, for example, a WeChat interface 110 shown in (c) in FIG. 1.

As shown in (a) in FIG. 1, the Recent key 102 is located on a navigation bar 103 of the mobile phone 100. The navigation bar is a shortcut button bar at a bottom of a screen of the mobile phone, and generally appears at a bottom end of the screen of the mobile phone in a form of virtual keys. The navigation bar includes three buttons by default: a Back key, the Home key, and the Recent key, where the Back key is used to return to a previous interface, the Home key is used to return to a desktop, and the Recent key is used to display a recently used application program. As shown in (a) in FIG. 1, the navigation bar 103 includes the Back key 104, the Home key 105, and the Recent key 102.

However, regardless of whether the user controls, by tapping the Recent key 102 or double-tapping the Home key, the mobile phone to display the multi-task interface, and then taps to select a task window in the multi-task interface to implement application switching, the user needs to perform operations at least twice in different positions of the mobile phone, to implement application switching. User operations are complex, and human-machine interaction performance is relatively poor.

This application provides a task switching method and a terminal, where the method may be applied to a process in which the terminal switches between a plurality of tasks recently run by the terminal. Specifically, the terminal may implement, in response to one continuous operation of a user on a side edge of the terminal, switching between the tasks recently run by the terminal, to reduce user operations in the task switching process, and improve human-machine interaction performance.

It should be noted that, the terminal may switch displaying of interfaces of the plurality of tasks recently run by the terminal. For example, in this application, the plurality of tasks recently run by the terminal are a plurality of applications recently run by the terminal; or the plurality of tasks may be a plurality of application tasks in a first application currently run by the terminal.

The terminal in this application may be an electronic device with a sensor disposed on its side edge. For example, the terminal may be a mobile phone (such as the mobile phone 100 shown in FIG. 1), a tablet computer, a personal computer (PC), a personal digital assistant (PDA), a smartwatch, a netbook, a wearable electronic device, or the like. A specific form of the terminal is not specifically limited in this application.

Figure 2:
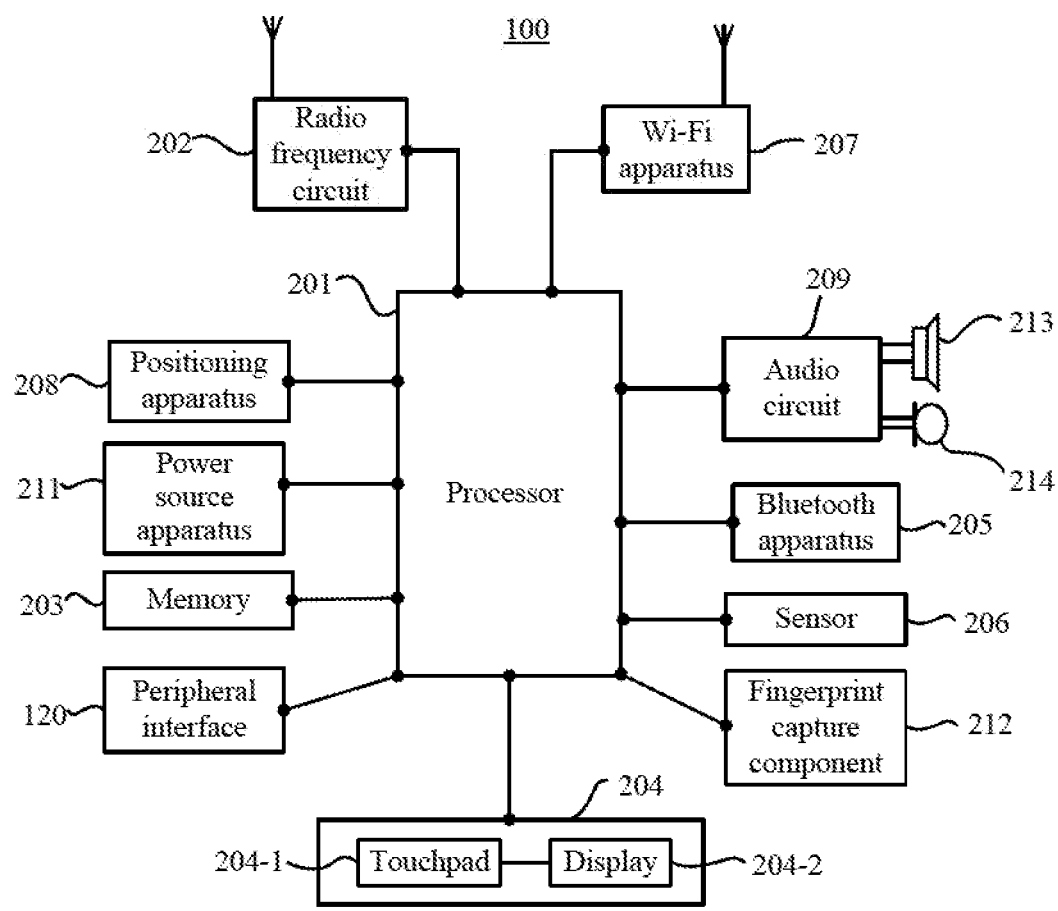
FIG. 2 is a schematic structural diagram of hardware of a terminal according to an embodiment of this application.

The task switching method provided in this application may be performed by a task switching apparatus, where the task switching apparatus may be the terminal shown in FIG. 1 or FIG. 2. In addition, the task switching apparatus may also be a central processing unit (CPU), or a control module that is in the terminal and is configured to perform task switching. The task switching method provided by this embodiment of the present invention is described by using an example in which the terminal performs the task switching method in this embodiment of the present invention.

As shown in FIG. 2, the mobile phone 100 is used as an example of the terminal. The mobile phone 100 may specifically include components such as a processor 201, a radio frequency (RF) circuit 202, a memory 203, a touchscreen 204, a Bluetooth apparatus 205, one or more sensors 206, a Wi-Fi apparatus 207, a positioning apparatus 208, an audio circuit 209, a peripheral interface 210, and a power source 211. The components may perform communication by using one or more communications buses or signal cables (not shown in FIG. 2). A person skilled in the art may understand that, a hardware structure shown in FIG. 2 does not constitute a limitation on the mobile phone. A quantity of components included in the mobile phone 100 may be greater or less than that shown in the figure, or some components are combined, or component arrangements are different.

The following describes each component of the mobile phone 100 in detail with reference to FIG. 2.

The processor 201 is a control center of the mobile phone 100. The processor 201 is connected to all parts of the mobile phone 100 by using various interfaces and lines, and executes various functions and data processing of the mobile phone 100 by running or executing an application program stored in the memory 203 and invoking data stored in the memory 203. In some embodiments, the processor 201 may include one or more processing units. In some embodiments of this application, the processor 201 may further include a fingerprint verification chip, configured to verify a captured fingerprint.

The radio frequency circuit 202 may be configured to receive and send radio signals. Particularly, after receiving downlink data from a base station, the radio frequency circuit 202 may send the downlink data to the processor 201 for processing, and send uplink data to the base station. Generally, the radio frequency circuit includes but is not limited to an antenna, at least one amplifier, a transceiver, a coupler, a low noise amplifier, a duplexer, or the like. In addition, the radio frequency circuit 202 may further communicate with another device through wireless communication. The wireless communication may be based on any communication standard or protocol, including but not limited to the global system for mobile communications, general packet radio service, code division multiple access, wideband code division multiple access, long term evolution, or the like.

The memory 203 is configured to store the application program and data. The processor 201 executes various functions and data processing of the mobile phone 100 by running the application program and data stored in the memory 203. The memory 203 mainly includes a program storage area and a data storage area. The program storage area may store an operating system, an application program required by at least one function (such as an audio playing function or an image viewing function). The data storage area may store data (such as audio data or a phone book) that is created according to usage of the mobile phone 100. In addition, the memory 203 may include a high-speed random access memory (RAM), and may further include a non-volatile memory, for example, a magnetic disk storage device, a flash memory, or another non-volatile solid-state storage device. The memory 203 may store various operating systems. The memory 203 may be independent, and is connected to the processor 201 by using the communications bus; or the memory 203 may be integrated with the processor 201.

The touchscreen 204 may specifically include a touchpad 204-1 and a display 204-2.

The touchpad 204-1 may capture a touch event of a user of the mobile phone 100 on or near the touchpad (for example, an operation performed by the user by using any appropriate object such as a finger or a stylus on the touchpad 204-1 or near the touchpad 204-1), and send captured touch information to another component (for example, the processor 201). The touch event near the touchpad 204-1 may be referred to as a floating touch. The floating touch may be that the user does not need to directly touch the touchpad for selecting, moving, or dragging an object (for example, an icon), and that the user only needs to be located near the device for ease of performing a required function. In addition, the touchpad 204-1 may be implemented by using a plurality of types such as resistive, capacitive, infrared, and surface acoustic wave.

The display (also referred to as a display screen) 204-2 may be configured to display information input by the user or information provided for the user and various menus of the mobile phone 100. The display 204-2 may be configured in a form of a liquid crystal display, an organic light-emitting diode, or the like. The touchpad 204-1 may cover the display 204-2. After detecting the touch event on or near the touchpad 204-1, the touchpad 204-1 transmits the touch event to the processor 201 to determine a type of the touch event. Then the processor 201 may provide a corresponding visual output on the display 204-2 based on the type of the touch event.

It should be noted that, although the touchpad 204-1 and the display panel 204-2 are used as two independent components to implement input and output functions of the mobile phone 100 in FIG. 2, the touchpad 204-1 and the display screen 204-2 may be integrated to implement the input and output functions of the mobile phone 100 in some embodiments. It may be understood that, the touchscreen 204 may be formed by a plurality of stacked layers of materials. Only the touchpad (layer) and the display screen (layer) are presented in this embodiment of this application. Other layers are not described in this embodiment of this application. In addition, the touchpad 204-1 may be configured on a front side of the mobile phone 100 in a form of a complete panel, and the display screen 204-2 may also be configured on the front side of the mobile phone 100 in a form of a complete panel. Therefore, a bezel-less structure can be implemented for the front side of the mobile phone.

In addition, the mobile phone 100 may further have a fingerprint recognition function. For example, a fingerprint recognizer 212 may be configured on a rear side (for example, below a rear camera) of the mobile phone 100, or a fingerprint recognizer 212 is configured on a front side (for example, below the touchscreen 204) of the mobile phone 100. For another example, a fingerprint recognizer 212 may be configured in the touchscreen 204 to implement the fingerprint recognition function. To be specific, the fingerprint recognizer 212 may be integrated with the touchscreen 204 to implement the fingerprint recognition function of the mobile phone 100. In this case, the fingerprint recognizer 212 is configured in the touchscreen 204, and may be a part of the touchscreen 204, or may be configured in the touchscreen 204 in another manner. A main component of the fingerprint recognizer 212 in this embodiment of this application is a fingerprint sensor. The fingerprint sensor may use any type of sensing technology, including but not limited to an optical, capacitive, piezoelectric, or ultrasonic sensing technology, or the like.

The mobile phone 100 may further include the Bluetooth apparatus 205, configured to implement data exchange between the mobile phone 100 and another short-range device (for example, a mobile phone or a smartwatch). The Bluetooth apparatus in this embodiment of this application may be an integrated circuit, a Bluetooth chip, or the like.

The one or more sensors 206 include a sensor that is disposed on a side edge of the mobile phone and may be configured to detect a pressing operation of the user on the side edge and a sliding operation of the user on the side edge. The side edge in this application includes a left side edge of the terminal and/or a right side edge of the terminal.

Figure 3A:
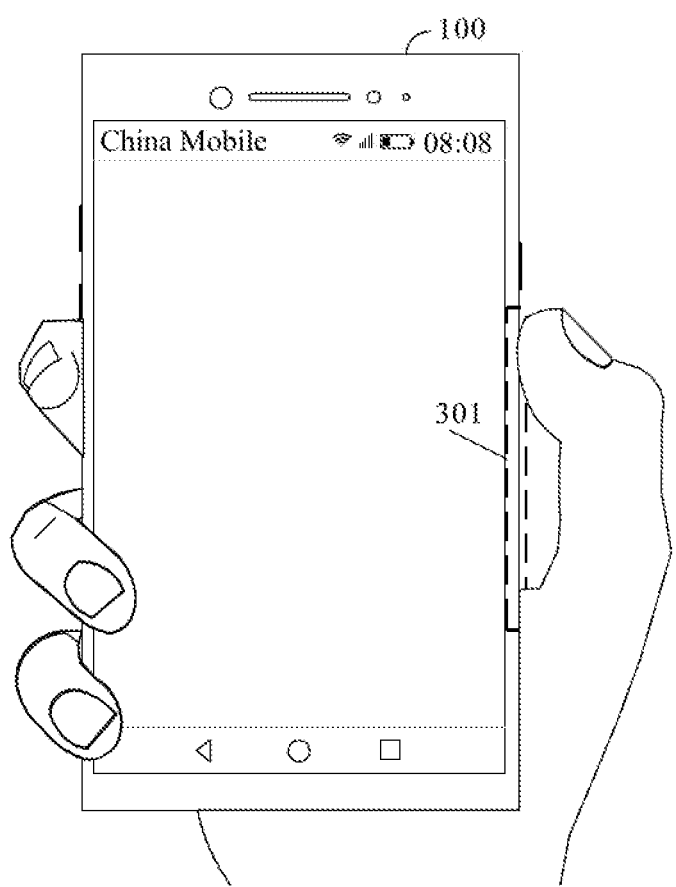
FIG. 3A is a schematic diagram of an example of a side edge on which a sensor is installed on a terminal according to an embodiment of this application.
Figure 3B:
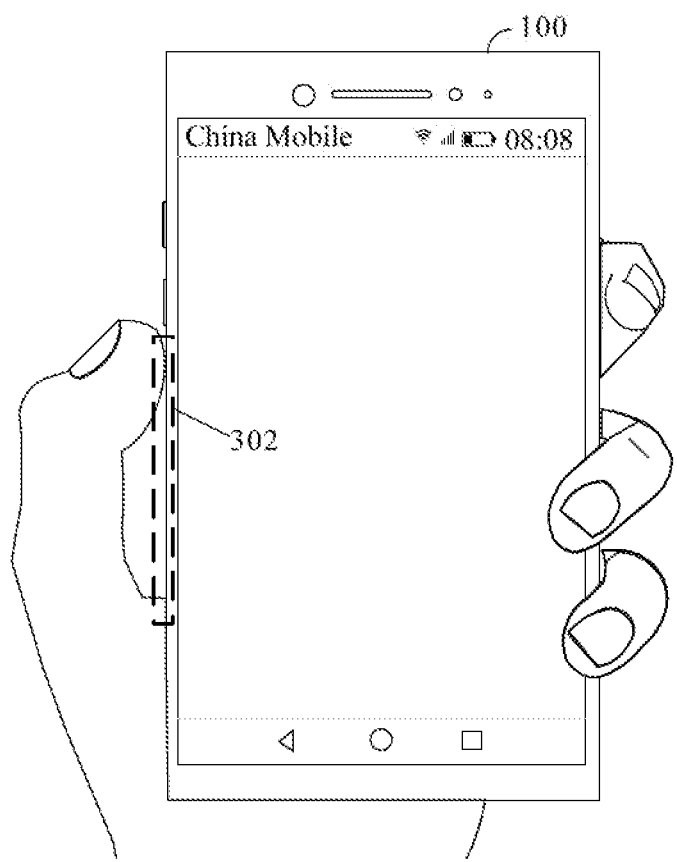
FIG. 3B is a schematic diagram of another example of a side edge on which a sensor is installed on a terminal according to an embodiment of this application.

For example, as shown in FIG. 3A, the sensor may be disposed on the right side edge of the mobile phone 100. The sensor is specifically located on the right side edge of the mobile phone 100, that is, in a position corresponding to a dashed-line block 301 shown in FIG. 3A. Alternatively, as shown in FIG. 3B, the sensor may be disposed on the left side edge of the mobile phone 100. The sensor is specifically located on the left side edge of the mobile phone 100, that is, in a position corresponding to a dashed-line block 302 shown in FIG. 3B. Alternatively, the sensors may be disposed on both the left side edge and the right side edge of the mobile phone 100. For example, as shown in (a) in FIG.

3C, the sensor may be disposed in a position corresponding to a dashed-line block 303 on the right side edge of the mobile phone 100; and the sensor may be disposed in a position corresponding to a dashed-line block 304 on the left side edge of the mobile phone 100.

It should be noted that, the sensor may be disposed in a position that is on the side edge of the terminal and facilitates a user operation when the user holds the terminal. A specific position of the sensor on the side edge of the terminal is not limited in this application.

Figure 3C:
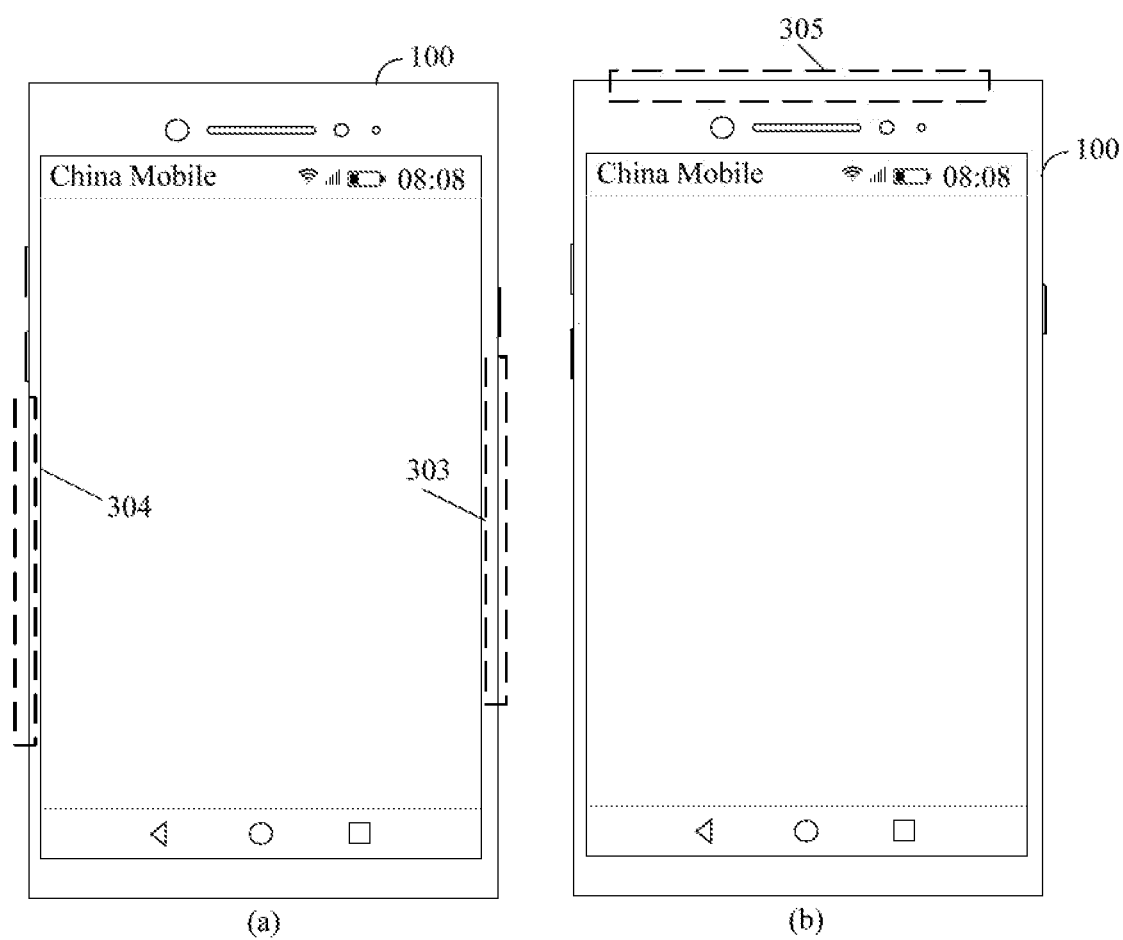
FIG. 3C is a schematic diagram of an another example of a side edge on which a sensor is installed on a terminal according to an embodiment of this application.

In addition, the side edge in this application may be not only the left side edge and/or the right side edge of the terminal, but also an upper side edge and/or a lower side edge of the terminal. This is not limited in this application. For example, as shown in (b) in FIG. 3C, the sensor may be disposed in a position corresponding to a dashed-line block 305 on the upper side edge of the mobile phone 100.

Certainly, the one or more sensors 206 include but are not limited to the foregoing sensor. For example, the one or more sensors 206 may further include a light sensor, a motion sensor, and another sensor. Specifically, the light sensor may include an ambient light sensor and a proximity sensor. The ambient light sensor may adjust luminance of the touchscreen 204 based on brightness of ambient light. The proximity sensor may turn off the display when the mobile phone 100 moves to an ear. As a type of motion sensor, an accelerometer sensor may detect acceleration magnitudes in all directions (generally tri-axis), and when the accelerometer sensor is stationary, may detect a magnitude and a direction of gravity, and may be used in a posture recognition application of the mobile phone (for example, switching between landscape orientation and portrait orientation, a related game, or magnetometer posture calibration), a function related to vibration recognition (for example, a pedometer or a stroke), or the like. For other sensors that may be configured for the mobile phone 100, such as a gyroscope, a barometer, a hygrometer, a thermometer, and an infrared sensor, details are not described herein.

The Wi-Fi apparatus 207 is configured to provide network access complying with a Wi-Fi related standard for the mobile phone 100. By using the Wi-Fi apparatus 207, the mobile phone 100 may access a Wi-Fi hotspot, and further help the user send and receive e-mails, browse web pages, access streaming media, and the like. The Wi-Fi apparatus 207 provides wireless broadband Internet access for the user. In other embodiments, the Wi-Fi apparatus 207 may also be used as a Wi-Fi wireless access point, and may provide Wi-Fi network access for another device.

The positioning apparatus 208 is configured to provide a geographic location for the mobile phone 100. It may be understood that, the positioning apparatus 208 may be specifically a receiver of a positioning system such as a global positioning system (GPS), a BeiDou navigation satellite system, or Russian GLONASS.

After receiving the geographic location information sent by the positioning system, the positioning apparatus 208 sends the information to the processor 201 for processing, or sends the information to the memory 203 for storage. Alternatively, in other embodiments, the positioning apparatus 208 may be a receiver of an assisted global positioning system (AGPS). The AGPS, as an assistance server, assists the positioning apparatus 208 in completing ranging and positioning services. In this case, the positioning assistance server communicates with the positioning apparatus 208 (that is, a GPS receiver) of a device such as the mobile phone 100 to provide positioning assistance.

Alternatively, in other embodiments, the positioning apparatus 208 may be a positioning technology based on a Wi-Fi hotspot. Because each Wi-Fi hotspot has a globally unique media access control (MAC) address, the device may scan and capture broadcast signals of nearby Wi-Fi hotspots when Wi-Fi is enabled, and therefore can obtain MAC addresses broadcast by the Wi-Fi hotspots; the device sends, to a location server by using a wireless communications network, data (for example, the MAC addresses) that can identify the Wi-Fi hotspots; and the location server retrieves a geographic location of each Wi-Fi hotspot, calculates the geographic location of the device with reference to strength of the Wi-Fi broadcast signals, and sends the geographic location to the positioning apparatus 208 of the device.

The audio circuit 209, a speaker 213, and a microphone 214 may provide an audio interface between the user and the mobile phone 100. The audio circuit 209 may convert received audio data into an electrical signal and then transmit the electrical signal to the speaker 213, and the speaker 213 converts the electrical signal into an audio signal for outputting. On the other hand, the microphone 214 converts a captured audio signal into an electrical signal, and the audio circuit 209 converts the received electrical signal into audio data and then outputs the audio data to the RF circuit 202; and then the audio data is transmitted to another mobile phone, or the audio data is output to the memory 203 for further processing.

The peripheral interface 210 is configured to provide various interfaces for external input/output devices (for example, a keyboard, a mouse, an external display, an external memory, and a subscriber identity module card). For example, the peripheral interface is connected to the mouse by using a universal serial bus (USB) interface, or connected, by using a metal contact in a subscriber identity module card slot, to a subscriber identity module (SIM) card provided by a telecommunications operator. The peripheral interface 210 may be configured to couple the external input/output peripheral device to the processor 201 and the memory 203.

In this embodiment of the present invention, the mobile phone 100 may communicate with another device in a device group by using the peripheral interface 210, for example, may receive, by using the peripheral interface 210, displayed data sent by another device and display the data. This is not limited in this embodiment of the present invention.

The mobile phone 100 may further include the power source apparatus 211 (such as a battery and a power management chip) supplying power to each component. The battery may be logically connected to the processor 201 by using the power management chip, so that functions such as charge and discharge management and power consumption management are implemented by using the power source apparatus 211.

Although not shown in FIG. 2, the mobile phone 100 may further include a camera (a front camera and/or a rear camera), a flash, a micro projection apparatus, a near field communications (NFC) apparatus, and the like.

Details are not described herein.

All methods in the following embodiments may be implemented in the mobile phone 100 having the foregoing hardware structure.

Figure 4:
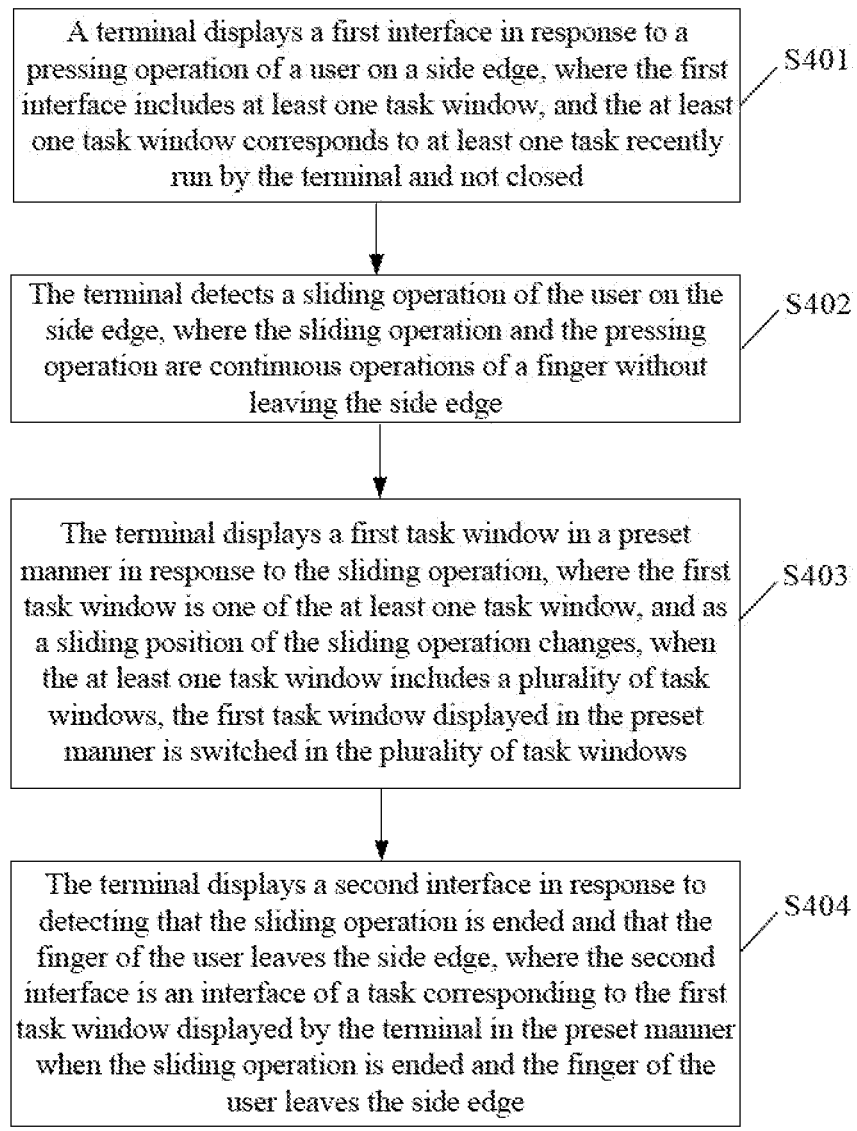
FIG. 4 is a flowchart of a task switching method according to an embodiment of this application.

This application provides a task switching method. The task switching method may be applied to a terminal, where a sensor is installed on a side edge of the terminal, and the sensor is configured to detect an operation of a user on the side edge. As shown in FIG. 4, the task switching method includes S401 to S404.

S401. A terminal displays a first interface in response to a pressing operation of a user on a side edge, where the first interface includes at least one task window, and the at least one task window corresponds to at least one task recently run by the terminal and not closed.

A sensor is installed on the side edge of the terminal, and the sensor may detect a tapping operation, a pressing operation, a sliding operation, and the like of the user on the side edge. For example, when the user presses the side edge, the sensor may detect a pressure value of pressing the side edge by the user, and transmit the detected pressure value to a processor of the terminal. When determining that the pressure value is greater than a preset pressure threshold, the processor may determine that the operation of the user on the side edge is a pressing operation, and may instruct a touchscreen of the terminal to display the first interface.

In a first application scenario of this application, the at least one task recently run by the terminal includes at least one application recently run by the terminal and not closed. A first task window is a task window of one of the at least one application recently run by the terminal and not closed. The at least one task recently run by the terminal and not closed is a task that is started and not closed in the terminal after the terminal is powered on recently, and the terminal may be in a running state or may be in a sleep or idle state, or the like.

Figure 5:
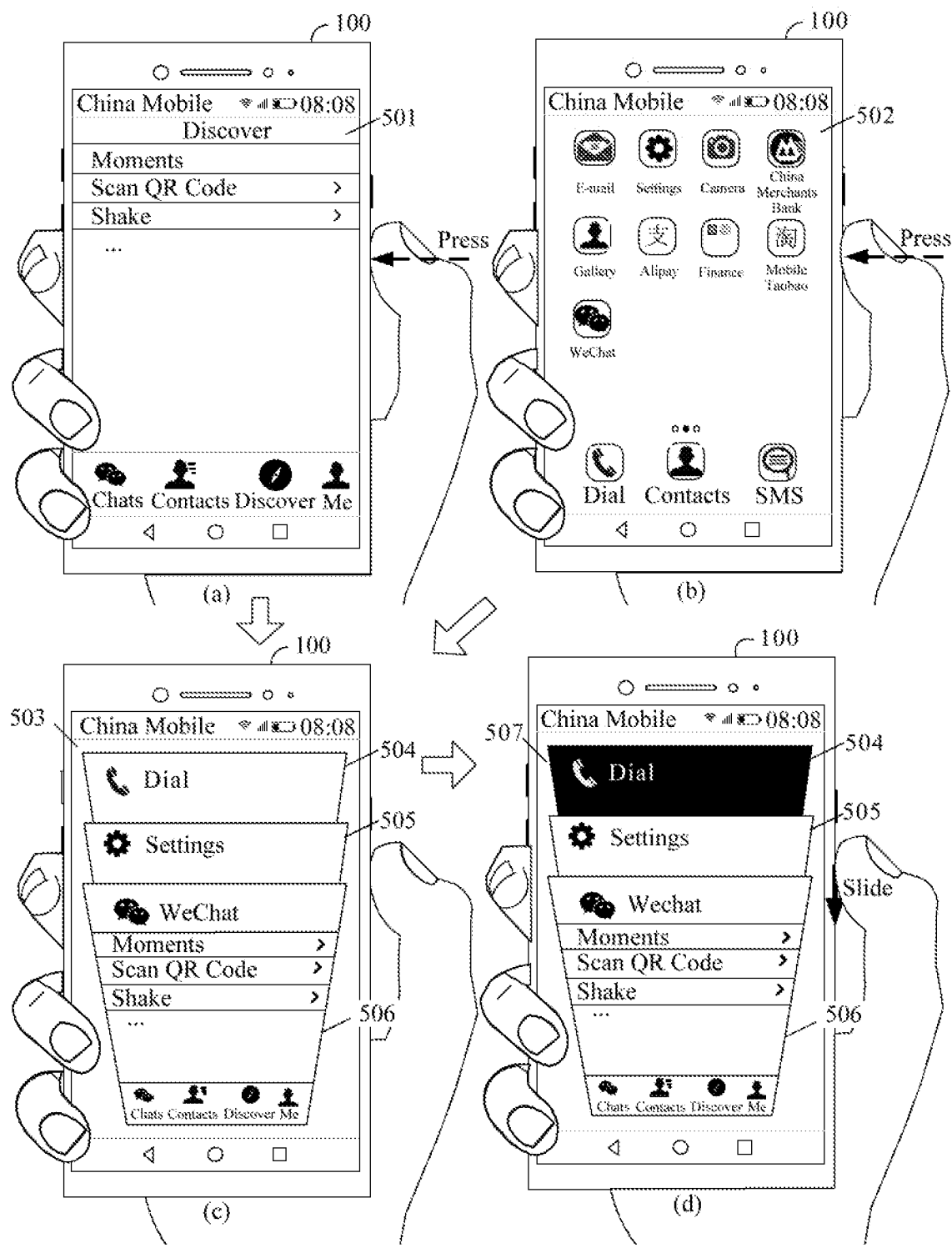
FIG. 5 is a schematic diagram of another example of a display interface of a terminal according to an embodiment of this application.

It should be noted that, in the first application scenario of this application, regardless of whether the terminal is currently displaying an interface of any application (for example, an interface 501 of a "WeChat" application shown in (a) in FIG. 5), or the terminal is currently displaying a desktop of the terminal (for example, a desktop 502 of the terminal shown in (b) in FIG. 5), the terminal may display, in response to the pressing operation of the user on the side edge, the first interface including a task window of the at least one application recently run by the terminal and not closed.

For example, the terminal is the mobile phone 100, and the sensor is installed on the right side edge of the mobile phone 100. As shown in (a) in FIG. 5, the mobile phone 100 currently displays the interface 501 of the "WeChat" application; and as shown in (b) in FIG. 5, the mobile phone currently displays the desktop 502 of the terminal. It is assumed that the at least one application recently run by the mobile phone 100 and not closed includes a "Dial-Up" application, a "Settings" application, and the "WeChat" application. In this case, after the user presses the mobile phone 100 shown in (a) in FIG. 5 or (b) in FIG. 5, the mobile phone 100 may display, in response to the pressing operation of the user on the mobile phone 100, a first interface 503 shown in (c) in FIG. 5. The first interface 503 shown in (c) in FIG. 5 includes the task window of the at least one application recently run by the mobile phone 100 and not closed, for example, a task window 504 of the "Dial-Up" application, a task window 505 of the "Settings" application, and a task window 506 of the "WeChat" application.

It should be noted that, task windows of applications included in the first interface may be arranged in ascending order of time of running the applications by the terminal, or task windows of applications included in the first interface may be arranged randomly. The order of the arranged task windows of the applications included in the first interface is not limited in this application.

Optionally, to avoid an unintentional operation of the user, the pressing operation may be a pressing operation of the user on at least two points of the side edge. To be specific, S401 may be replaced with S401a.

S401a. The terminal displays the first interface in response to a pressing operation of the user on at least two points of the side edge.

The pressing operation of the user on at least two points of the side edge may be a pressing operation of the user on at least two fixed positions of a same side edge of the terminal, for example, a pressing operation of the user on at least two fixed positions on the dashed-line block 303 shown in FIG. 3A. Alternatively, the pressing operation of the user on at least two points of the side edge may be a pressing operation of the user on at least two points of different side edges of the terminal. For example, the pressing operation may include a pressing operation of the user on the right side edge of the mobile phone 100 and a pressing operation of the user on the upper side edge of the mobile phone 100.

S402. The terminal detects a sliding operation of the user on the side edge, where the sliding operation and the pressing operation are continuous operations of a finger without leaving the side edge.

In this application, "the sliding operation and the pressing operation are continuous operations of a finger without leaving the side edge" specifically means that the finger of the user does not leave the side edge in a process from detecting the sliding operation of the user on the side edge by the terminal to detecting the sliding operation of the user on the side edge by the terminal.

For example, the sliding operation in this application may be a sliding operation immediately input on the side edge after the user inputs the pressing operation on the side edge. To be specific, there is no time interval between the sliding operation and the pressing operation, and the finger of the user does not leave the side edge. Alternatively, the sliding operation in this application may be a sliding operation input on the side edge N seconds after the user inputs the pressing operation on the side edge and the finger of the user does not leave the side edge of the terminal (that is, the finger of the user touches the side edge and stays on the side edge all the time). For example, N may be any one of numbers such as 3, 5, or 10. In this application, a value range of N is not limited.

S403. The terminal displays a first task window in a preset manner in response to the sliding operation, where the first task window is one of the at least one task window, and as a sliding position of the sliding operation changes, when the at least one task window includes a plurality of task windows, the first task window displayed in the preset manner is switched in the plurality of task windows.

For example, after the mobile phone 100 displays, in response to the pressing operation of the user on the side edge, the first interface 503 shown in (c) in FIG. 5, the finger of the user does not leave the side edge of the mobile phone 100. As shown in (d) in FIG. 5, alter the mobile phone 100 detects the sliding operation of the user on the side edge, the mobile phone 100 may display the task window 504 (that is, the first task window) of the "Dial-Up" application in black (that is, in the preset manner).

Optionally, the first task window displayed by the terminal in the preset manner in response to the sliding operation may be any task window in the at least one task window. The task window displayed in black by the mobile phone 100 in response to the sliding operation of the user on the side edge, for example, the task window 504 of the "Dial-Up" application shown in (d) in FIG. 5, may be replaced with the task window 506 of the "WeChat" application (not shown in FIG. 5). This is not limited in this application.

The sliding operation received by the terminal is a touch operation that is input by the user on the side edge and whose sliding position changes. In this application, as the sliding position of the sliding operation changes, when the at least one task window includes the plurality of task windows, the first task window displayed in the preset manner is switched in the plurality of task windows.

Figure 6:
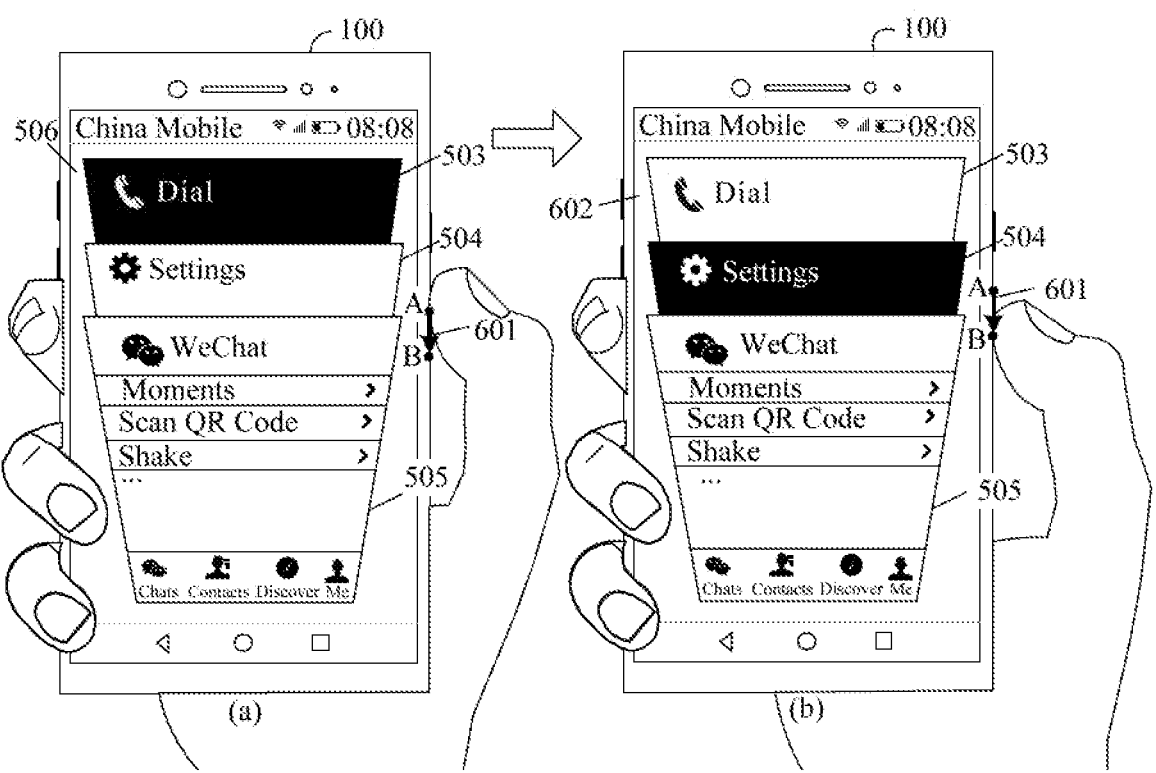
FIG. 6 is a schematic diagram of another example of a display interface of a terminal according to an embodiment of this application.

For example, as shown in FIG. 6, when the mobile phone 100 detects that the sliding position of the sliding operation changes along a sliding track 601 from a point A shown in (a) in FIG. 6 to a point B shown in (b) in FIG. 6, the first interface displayed by the mobile phone 100 may be switched from a first interface 506 shown in (a) in FIG. 6 to a first interface 602 shown in (b) in FIG. 6. In the first interface 602 shown in (b) in FIG. 6, the mobile phone 100 displays a task window 504 of the "Settings" application in black (that is, in the preset manner).

It may be understood that, as the sliding position of the sliding operation continues to change, the first task window displayed by the terminal in the preset manner continues to be switched in the plurality of task windows. For example, when the mobile phone 100 detects that the sliding position of the sliding operation continues to slide down along the sliding track 601 from the point B shown in (b) in FIG. 6, the mobile phone 100 may display the task window 505 (not shown in the figure) of the "WeChat" application in black (that is, in the preset manner).

It should be noted that, as the sliding position of the sliding operation changes, when the at least one task window includes only one task window, the terminal does not display the task window in the preset manner.

S404. The terminal displays a second interface in response to detecting that the sliding operation is ended and that the finger of the user leaves the side edge, where the second interface is an interface of a task corresponding to the first task window displayed by the terminal in the preset manner when the sliding operation is ended and the finger of the user leaves the side edge.

In the first application scenario of this application, the second interface is an interface of an application corresponding to the first task window displayed by the terminal in the preset manner when the sliding operation is ended and the finger of the user leaves the side edge. To be specific, when the terminal detects that the sliding operation is ended and that the finger of the user leaves the side edge, the terminal may display the interface (that is, the second interface) of the task corresponding to the first task window displayed by the terminal in the preset manner when the sliding operation is ended and the finger of the user leaves the side edge.

Figure 7:
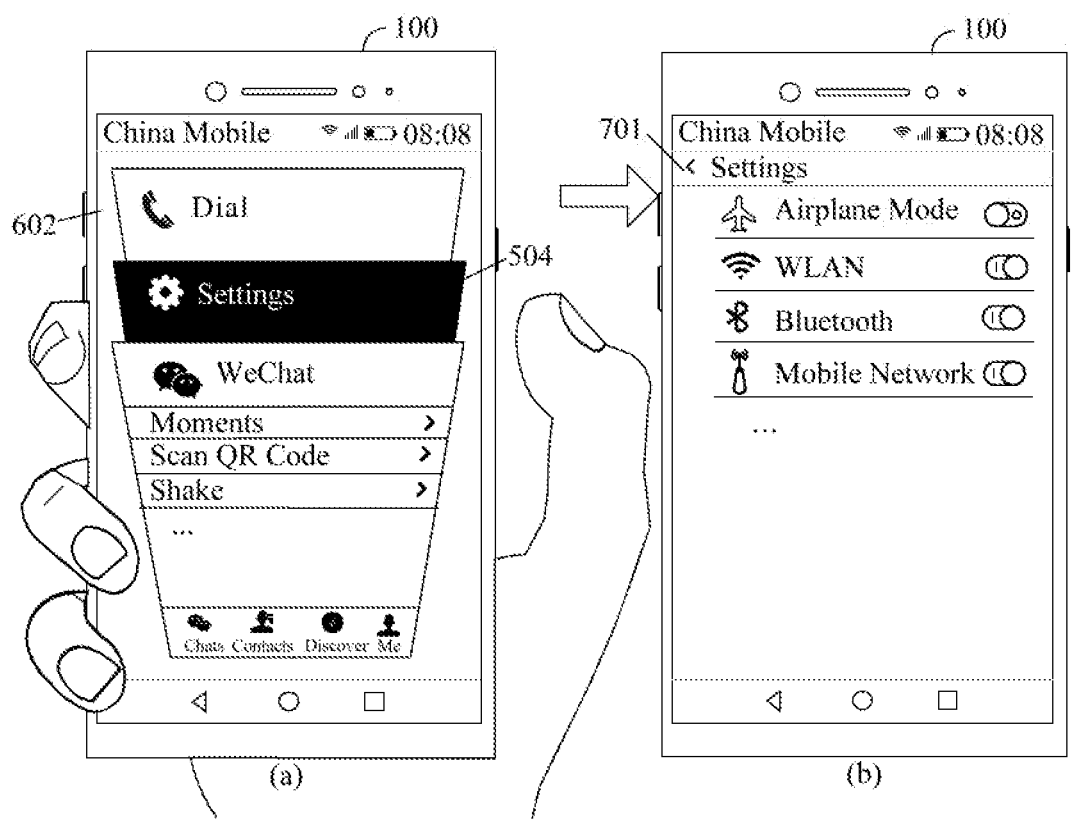
FIG. 7 is a schematic diagram of another example of a display interface of a terminal according to an embodiment of this application.

For example, as shown in (a) in FIG. 7, when the sliding operation is ended and the finger of the user leaves the side edge, the mobile phone 100 displays the task window 504 of the "Settings" application in black (that is, in the preset manner). In this case, as shown in (a) in FIG. 7, when the sliding operation is ended and the finger of the user leaves the side edge, the mobile phone 100 may display a second interface 701 shown in (b) in FIG. 7, where the second interface 701 is an interface of the "Settings" application.

Optionally, the preset manner in this application includes but is not limited to the foregoing "in black", as long as the display manner can visually distinguish the first task window displayed in the preset manner from other task windows in the first interface.

Figure 8:
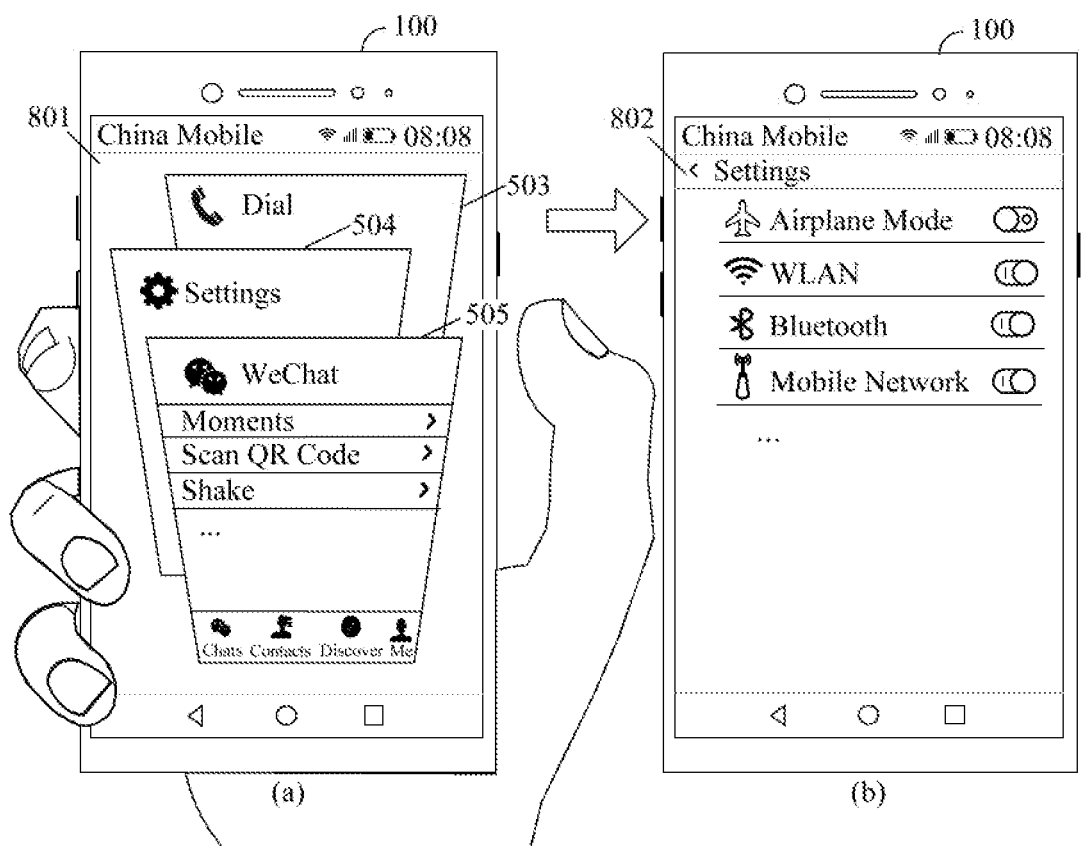
FIG. 8 is a schematic diagram of another example of a display interface of a terminal according to an embodiment of this application.

For example, as shown in (a) in FIG. 8, in a first interface 801, the mobile phone 100 may display the task window 504 of the "Settings" application in a manner of left protruding, so that the task window 504 of the "Settings" application is different from a task window 505 of the "WeChat" application and a task window 503 of the "Dial-Up" application. As shown in (a) in FIG. 8, when the sliding operation is ended and the finger of the user leaves the side edge, the mobile phone 100 may display a second interface 802 shown in (b) in FIG. 8, where the second interface 802 is an interface of the "Settings" application.

Optionally, the manner of displaying the at least one task window by the terminal in the first interface includes but is not limited to the display manner of vertical arrangement shown in FIG. 5 to FIG. 8. The terminal may further display the at least one task window in the first interface in a display manner of horizontal arrangement. For example, after the user presses the mobile phone 100 shown in FIG. 9, the mobile phone 100 may display, in response to the pressing operation of the user on the mobile phone 100, a first interface 901 shown in FIG. 9. The first interface 901 shown in FIG. 9 includes the task window of the at least one application recently run by the mobile phone 100 and not closed, for example, a task window 902 of the "Dial-Up" application, a task window 903 of the "Settings" application, and a task window 904 of the "WeChat" application.

Figure 10:
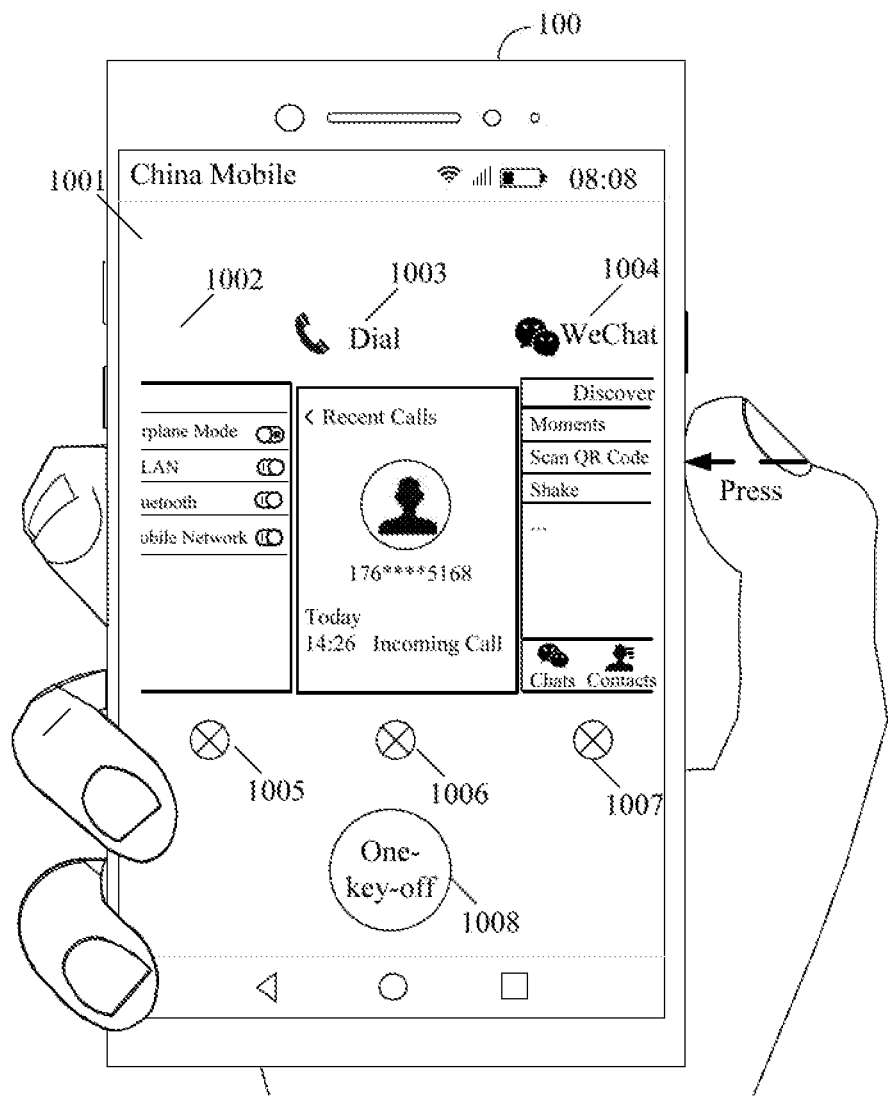
FIG. 10 is a schematic diagram of another example of a display interface of a terminal according to an embodiment of this application.

Alternatively, after the user presses the mobile phone 100 shown in FIG. 10, the mobile phone 100 may display, in response to the pressing operation of the user on the mobile phone 100, a first interface 1001 shown in FIG. 10. The first interface 1001 shown in FIG. 10 includes the task window of the at least one application recently run by the mobile phone 100 and not closed, for example, a task window 1002 of the "Settings" application, a task window 1003 of the "Dial-Up" application, and a task window 1004 of the "WeChat" application.

Optionally, the first interface in this application may further include a close button for closing each task window. For example, as shown in FIG. 10, the first interface 1001 may further include a close button 1005, a close button 1006, a close button 1007, and a one-key close button 1008. The close button 1005 is used to close the task window 1002 of the "Settings" application, the close button 1006 is used to close the task window 1003 of the "Dial-Up" application, and the close button 1007 is used to close the task window 1004 of the "WeChat" application. In this application, when the terminal closes a task window, an application corresponding to the task window is also closed. For example, when the mobile phone 100 closes the task window 1004 of the "WeChat" application in response to a tapping operation of the user on the close button 1007, the mobile phone 100 also closes the "WeChat" application. The one-key close button 1008 is used to close all task windows in the first interface 1001 and applications corresponding to all the task windows. For example, the mobile phone 100 may close the task window 1002 of the "Settings" application and the "Settings" application, the task window 1003 of the "Dial-Up" application and the "Dial-Up" application, and the task window 1004 of the "WeChat" application and the "WeChat" application in response to a tapping operation of the user on the one-key close button 1008.

In a possible design method, the terminal may further distinguish, based on a position of the pressing operation, the display manner of displaying the at least one task window by the terminal in the first interface.

When the pressing operation is an operation of the user on a left side edge or a right side edge of the terminal, for example, when the pressing operation is an operation of the user on the right side edge of the terminal, as shown in FIG.

5 to FIG. 8, the terminal may display the at least one task window in the first interface in the display manner of vertical arrangement as shown in FIG. 5 to FIG. 8. When the pressing operation is an operation of the user on the right side edge of the terminal, the sliding operation is also an operation of the user on the right side edge of the terminal. The task windows are displayed in the display manner of vertical arrangement. As the sliding position of the sliding operation changes, in a process in which the first task window displayed in the preset manner is switched in the plurality of task windows, a switching direction of the task window is consistent with a sliding direction of the finger of the user. This is more compliant with the user's usage habit.

Figure 11A:
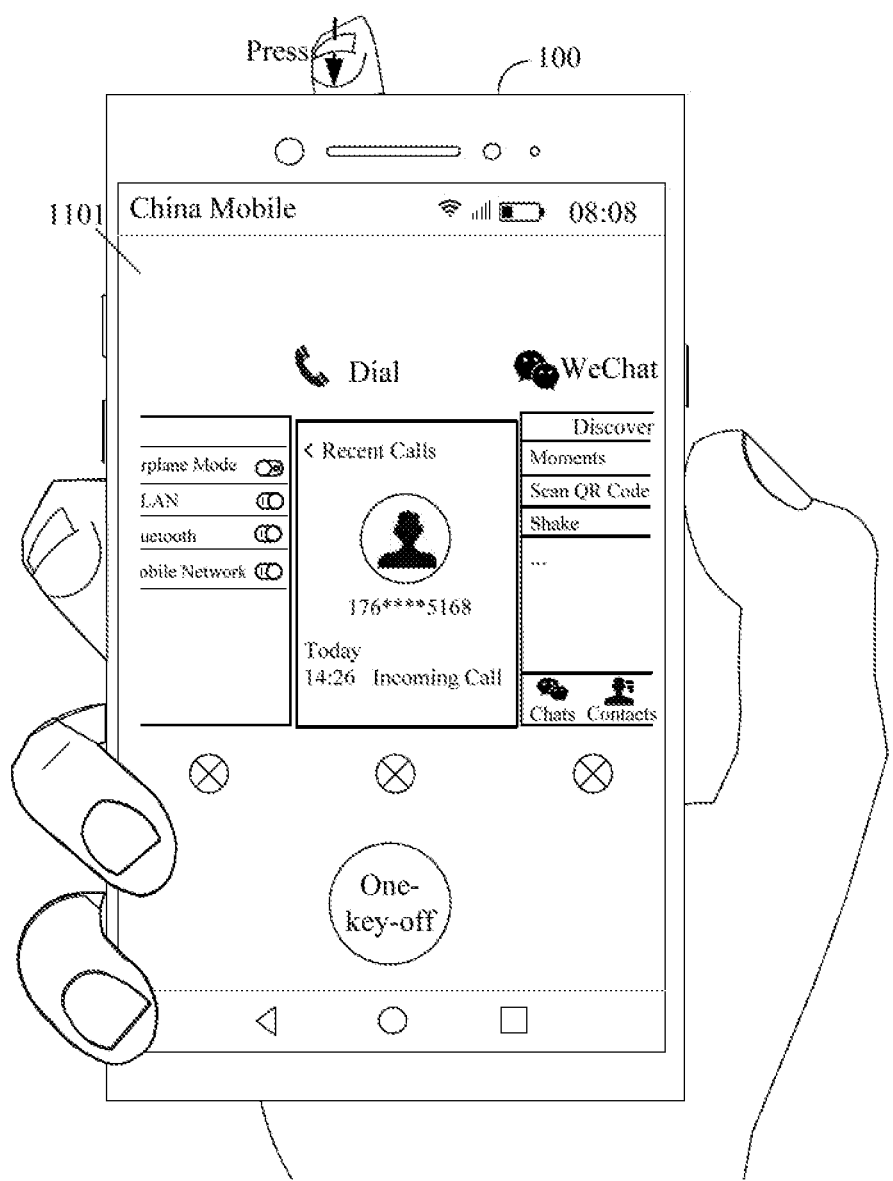
FIG. 11(a) and FIG. 11(b) area schematic diagrams of an additional examples of a display interface of a terminal according to an embodiment of this application.
Figure 11B:
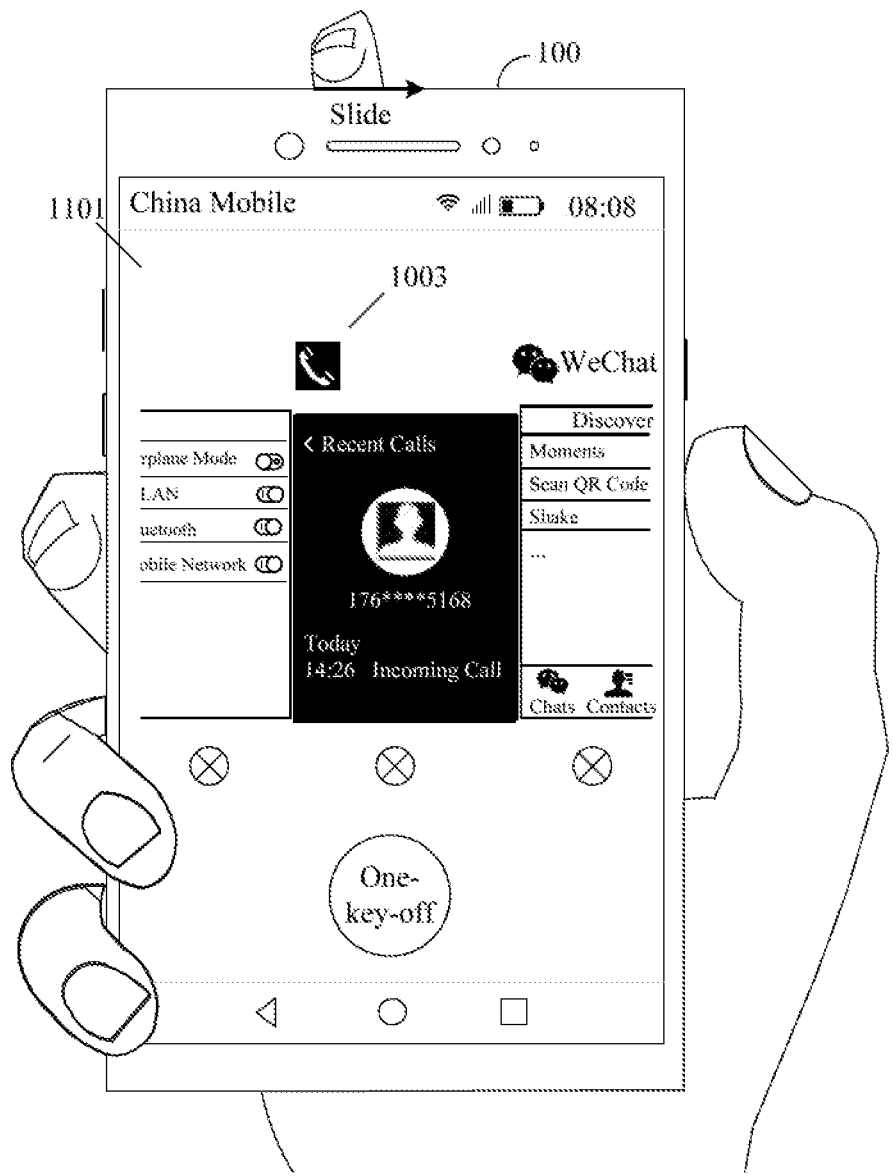

For another example, as shown in FIG. 11(a) and FIG. 11(b), when the pressing operation is an operation of the user on an upper side edge of the terminal, the terminal may display the at least one task window in the first interface in the display manner of horizontal arrangement shown in FIG. 11(a) and FIG. 11(b). When the pressing operation is an operation of the user on the upper side edge of the terminal, the sliding operation is also an operation of the user on the upper side edge of the terminal. The task windows are displayed in the display manner of horizontal arrangement. As the sliding position of the sliding operation changes, in a process in which the first task window displayed in the preset manner is switched in the plurality of task windows, a switching direction of the task window is consistent with a sliding direction of the finger of the user. This is more compliant with the user's usage habit.

Certainly, when sensors are disposed on a plurality of side edges of the terminal, the pressing operation and the sliding operation may also be operations of the user on different side edges on which the sensors are disposed. For example, when sensors are disposed on both the right side edge and the upper side edge of the terminal, the pressing operation may be an operation of the user on the right side edge, and the sliding operation may be an operation of the user on the upper side edge.

In the task switching method provided in this application, the terminal may display a multi-task interface (that is, the first interface) in response to the pressing operation of the user on the side edge, and then display the first task window in the multi-task interface in the preset manner in response to the sliding operation, where the sliding operation and the pressing operation are continuous operations of the finger without leaving the side edge. In addition, as the sliding position of the sliding operation changes, the first task window displayed in the preset manner is switched in the plurality of task windows. Finally, in response to detecting that the sliding operation is ended and that the finger of the user leaves the side edge, the terminal may display the interface (that is, the second interface) including the task corresponding to the first task window displayed by the terminal in the preset manner when the sliding operation is ended and the finger of the user leaves the side edge.

In this application, the terminal may implement functions of "displaying the multi-task interface" and "selecting a task window from the multi-task interface for performing application switching" in response to the pressing operation and the sliding operation that are continuous operations of the finger without leaving the side edge, and the user does not need to perform operations at least twice in different positions of the mobile phone. According to this application, user operations in application switching can be reduced, human-machine interaction performance can be improved, and user experience can be improved.

In a second application scenario of this application, when there are at least two applications recently run by the terminal and not closed, the at least one task window in the first interface is task windows of the at least two applications; or when an application recently run by the terminal and not closed includes only a first application, the at least one task window in the first interface is a task window of an application task in the first application, where the first application in this application is an application that is being run by the terminal when the terminal responds to the pressing operation.

Figure 12:
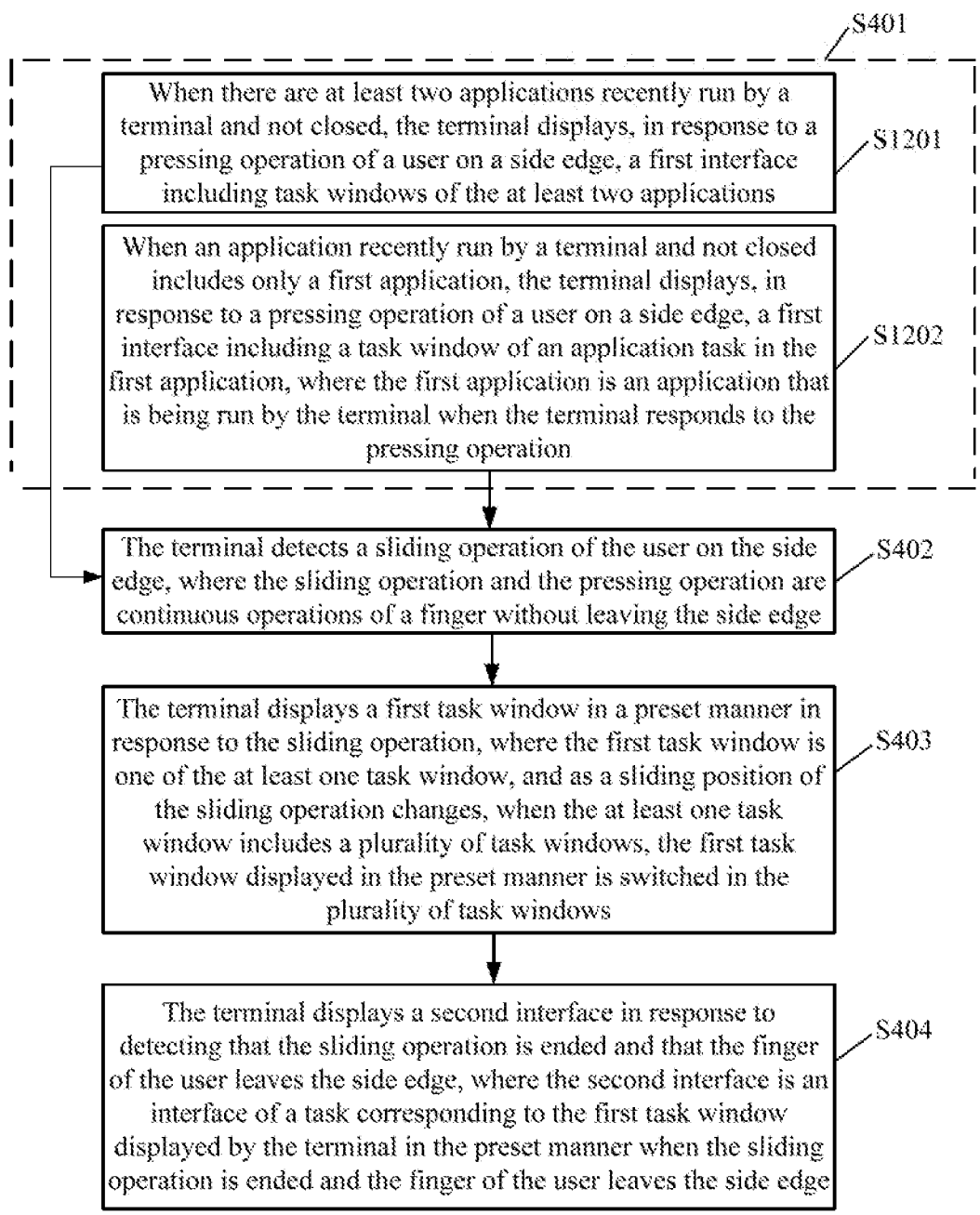
FIG. 12 is a flowchart of another task switching method according to an embodiment of this application.

Specifically, in an implementation of the second application scenario, when there are at least two applications recently run by the terminal and not closed, the at least one task window in the first interface is task windows of the at least two applications. As shown in FIG. 12, S401 shown in FIG. 4 may include S1201.

S1201. When there are at least two applications recently run by the terminal and not closed, the terminal displays, in response to the pressing operation of the user on the side edge, the firust interface including task windows of the at least two applications.

Correspondingly, in this implementation, the task windows included in the first interface are the task windows of the at least two applications. For example, as shown in any one of (c) in FIG. 5, FIG. 6, (a) in FIG. 7, (a) in FIG. 8, and FIG. 9 to FIG. 11(b), the first interface includes the task window of the "WeChat" application, the task window of the "Dial-Up" application, and the task window of the "Settings" application recently run by the mobile phone 100 and not closed. The first task window is a task window of one of the at least two applications. The second interface is an interface of an application corresponding to the first task window displayed by the terminal in the preset manner when the sliding operation is ended and the finger of the user leaves the side edge. For example, as shown in (b) in FIG. 7 or (b) in FIG. 8, the second interface is the interface of the "Settings" application.

In another implementation of the second application scenario, when an application recently run by the terminal and not closed includes only a first application, the at least one task window in the first interface is a task window of an application task in the first application. As shown in FIG. 12, S401 shown in FIG. 4 may further include S1202.

S1202. When an application recently run by the terminal and not closed includes only a first application, the terminal displays, in response to the pressing operation of the user on the side edge, the first interface including a task window of an application task in the first application, where the first application is an application that is being run by the terminal when the terminal responds to the pressing operation.

The first application in this application may be an embedded application program in the terminal (that is, a system application in the terminal), or an application program that may be downloaded. The embedded application program is an application program provided as a part of the implementation of the terminal (such as the mobile phone 100), for example, the "Settings" application or the "Browser" application. The application program that may be downloaded is an application program that may provide an Internet Protocol multimedia subsystem (Internet Protocol Multimedia Subsystem, IMS) connection of the application program. The application program that may be downloaded may be an application preinstalled in the terminal or may be a third-party application downloaded and installed by the user in the terminal, for example, the "WeChat" application, and an "Alipay" application.

In this implementation, the task window included in the first interface is a task window of at least one application task in the first application. For example, it is assumed that an application recently run by the mobile phone 100 and not closed includes only the "Browser" application (that is, the first application). The mobile phone may display, in response to the pressing operation of the user on the side edge of the mobile phone 100 shown in (a) in FIG. 13 or (b) in FIG. 13, a first interface 1303 shown in (c) in FIG. 13. It is assumed that the mobile phone 100 opens two web page windows (that is, application task windows) of the "Browser" application when running the "Browser" application. As shown in (c) in FIG. 13, the first interface 1303 includes a web page window 1304 of a web page 1 and a web page window 1305 of a home page.

Correspondingly, the first task window is a task window of an application task in the first application. For example, the mobile phone 100 performs S403, and the first task window displayed in the preset manner (for example, in black) in response to the sliding operation is a web page window 1303 of a web page 1 in the "Browser" application shown in (d) in FIG. 13. In addition, the second interface is an interface of an application task corresponding to the first task window displayed by the terminal in the preset manner when the sliding operation is ended and the finger of the user leaves the side edge. For example, as shown in (b) in FIG. 14, a second interface 1401 displayed by the mobile phone 100 in response to detecting that the sliding operation is ended and that the finger of the user leaves the side edge is an interface of the web page window 1303 of the web page 1 displayed by the mobile phone in black when the sliding operation shown in (a) in FIG. 14 is ended and the finger of the user leaves the side edge.

Figure 13:
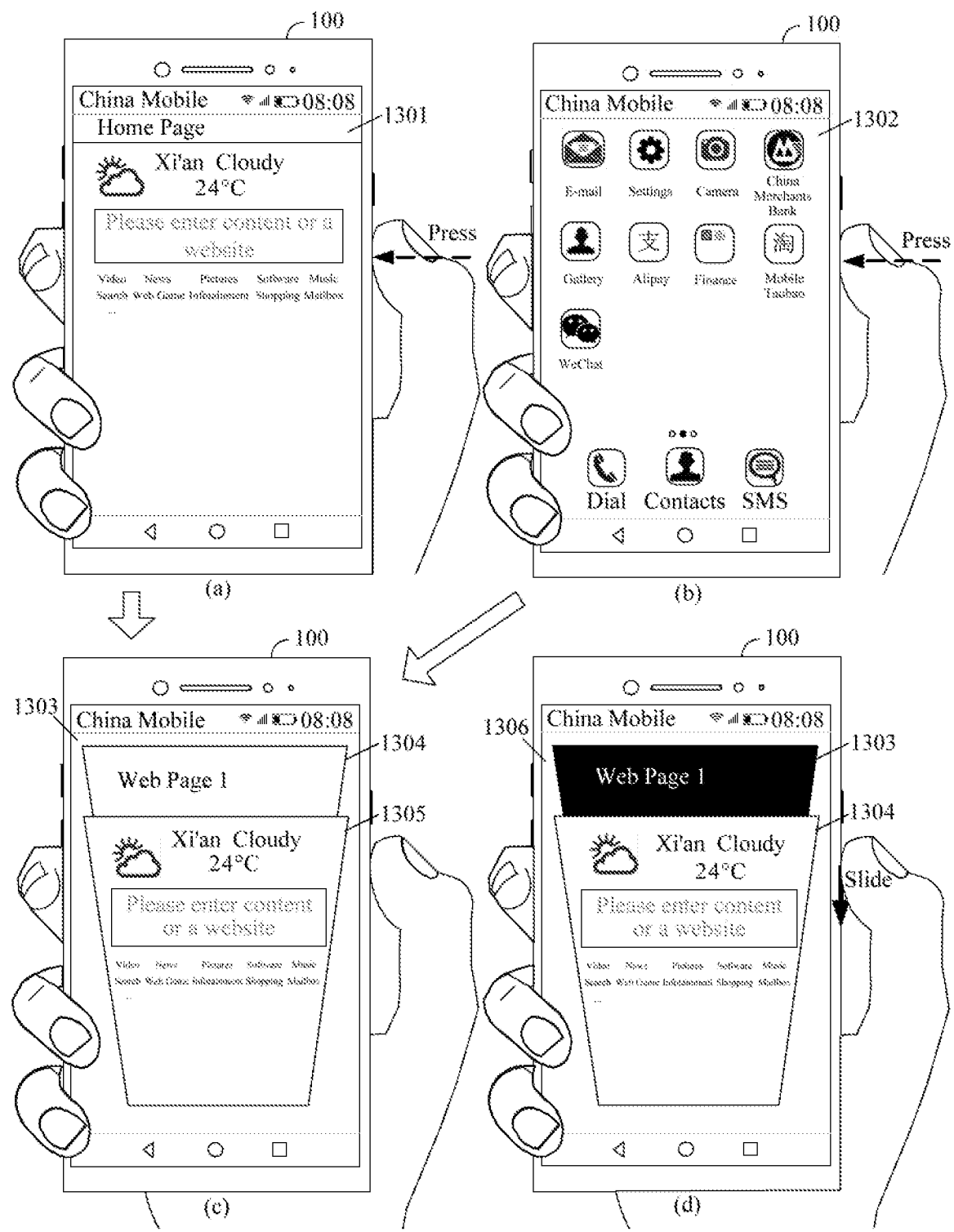
FIG. 13 is a schematic diagram of another example of a display interface of a terminal according to an embodiment of this application.
Figure 14:
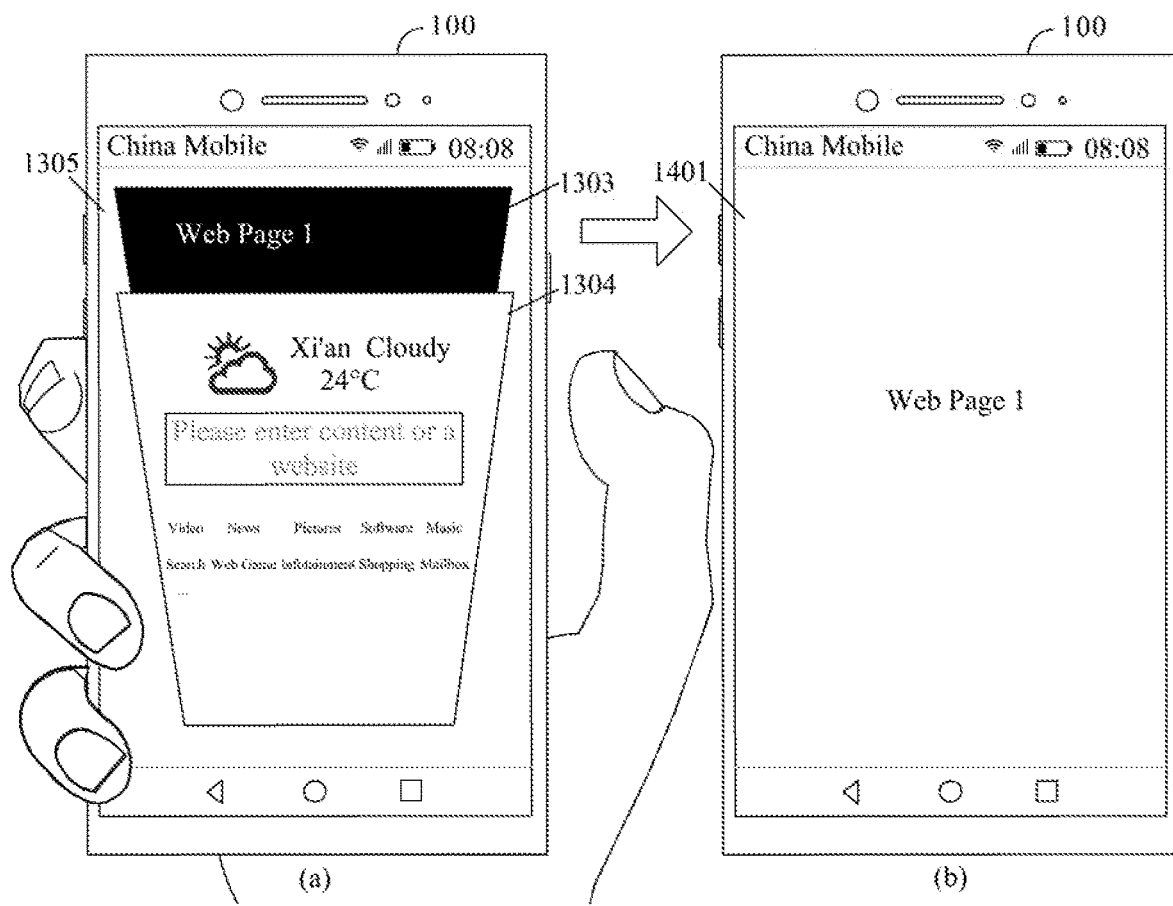
FIG. 14 is a schematic diagram of another example of a display interface of a terminal according to an embodiment of this application.

It should be noted that, in the second application scenario, if the application recently run by the terminal and not closed includes only the first application, regardless of whether the terminal currently displays a desktop 1302 of the terminal shown in (b) in FIG. 13, or an interface 1301 of the "Browser" application (that is, an interface of the first application) shown in (a) in FIG. 13, the terminal may display, in response to the pressing operation of the user on the side edge, the first interface (such as the first interface 1303 shown in (c) in FIG. 13) including the task window of the application task in the first application.

Figure 15:
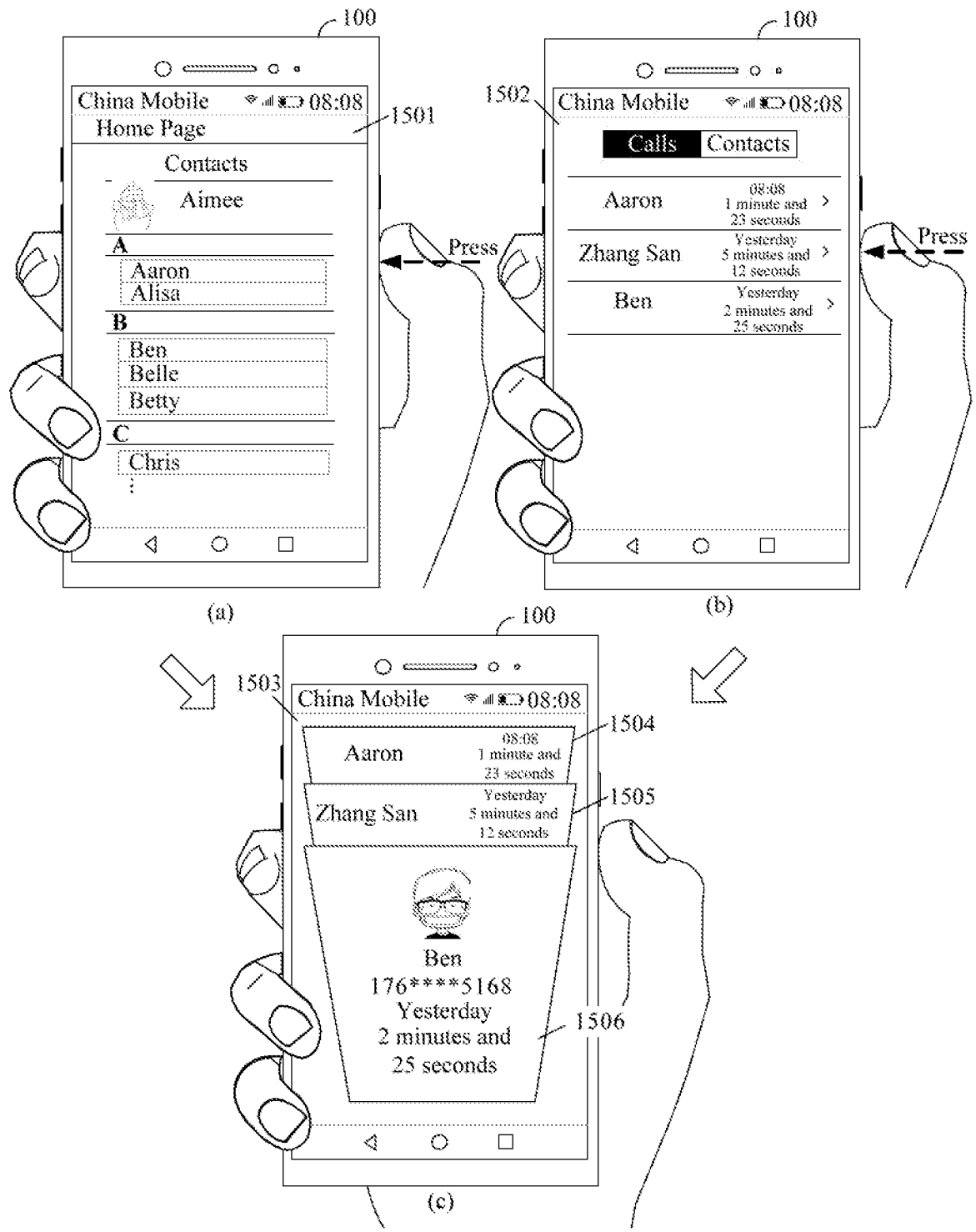
FIG. 15 is a schematic diagram of another example of a display interface of a terminal according to an embodiment of this application.

It should be noted that, the first application in this application includes but is not limited to the "Browser" application. The first application may be any application in the terminal. For example, the first application may be a "Contact" application in the terminal. For example, as shown in FIG. 15, the mobile phone may display, in response to the pressing operation of the user on the side edge of the mobile phone 100 shown in (a) in FIG. 15 or (b) in FIG. 15, a first interface 1503 shown in (c) in FIG. 15. It is assumed that when the mobile phone 100 runs the "Contact" application, recent contacts include Aaron, Zhang San, and Ben. As shown in (c) in FIG. 15, the first interface 1503 includes a contact window 1504 of Aaron, a contact window 1505 of Zhang San, and a contact window 1506 of Ben.

It should be noted that, regardless of the interface of the first application that the terminal currently displays, the terminal may display, in response to the pressing operation of the user on the side edge, the first interface including the task window of the application task in the first application. For example, regardless of whether the mobile phone currently displays a contact list interface 1501 (that is, an interface of the "Contact" application) shown in (a) in FIG. 15, or a contact list interface 1502 (that is, an interface of the "Contact" application) shown in (b) in FIG. 15, the terminal may display, in response to the pressing operation of the user on the side edge, the first interface (such as the first interface 1503 shown in (c) in FIG. 15) including a contact window in the "Contact" application.

Optionally, in the first interface 1503 shown in (c) in FIG. 15, a displayed first contact window (that is, the contact window 1506 of Ben) may be different from other contact windows (the contact window 1504 of Aaron and the contact window 1505 of Zhang San).

It should be noted that, in this application, for the manner of displaying the task window of the application task in the first application by the terminal in the first interface, reference may be made to the specific manner of displaying task windows of a plurality of applications by the terminal in the first interface in the foregoing embodiment. Details are not described again herein in this application.

In this application, the terminal may not only implement switching between applications in response to the pressing operation and the sliding operation that are continuous operations of the finger without leaving the side edge, but also implement switching between a plurality of application tasks in one application. To be specific, according to this application, user operations in switching between application tasks of one application can also be reduced, human-machine interaction performance can be improved, and user experience can be improved.

Figure 16:
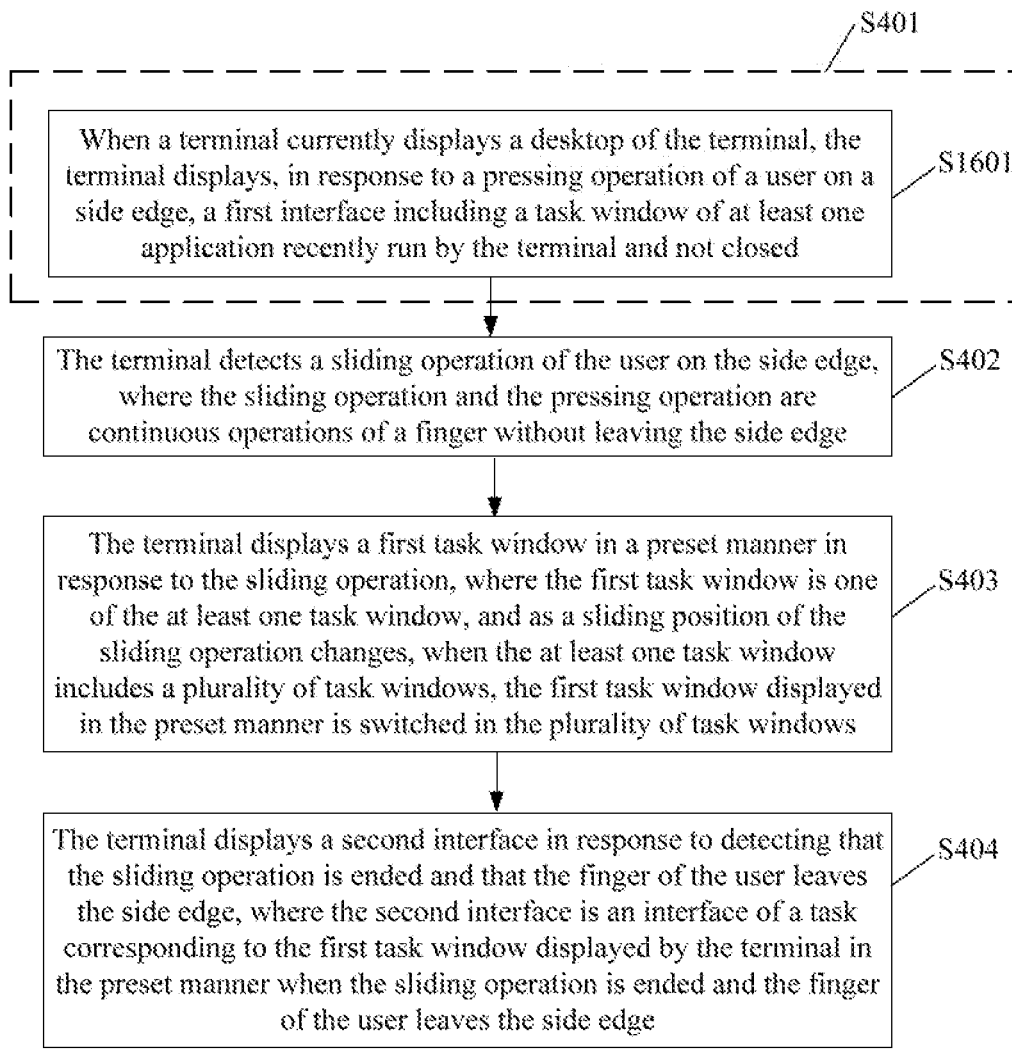
FIG. 16 is a flowchart of another task switching method according to an embodiment of this application.

In a third application scenario of this application, the terminal may determine, by using an interface currently displayed by the terminal, whether to display task windows of a plurality of applications in the first interface or display task windows of a plurality of application tasks in a first application. Specifically, when the terminal currently displays a desktop of the terminal, the terminal displays task windows of a plurality of applications in the first interface. Specifically, as shown in FIG. 16, S401 may be replaced with S1601.

S1601. When the terminal currently displays a desktop of the terminal, the terminal displays, in response to the pressing operation of the user on the side edge, the first interface including a task window of at least one application recently run by the terminal and not closed.

In the third application scenario, task windows included in the first interface are task windows of at least two applications. For example, as shown in (c) in FIG. 5, the first interface includes the task window of the "WeChat" application, the task window of the "Dial-Up" application, and the task window of the "Settings" application recently run by the mobile phone 100 and not closed. The first task window is a task window of one of the at least two applications. The second interface is an interface of an application corresponding to the first task window displayed by the terminal in the preset manner when the sliding operation is ended and the finger of the user leaves the side edge. For example, as shown in (b) in FIG. 7, the second interface is the interface of the "Settings" application.

Figure 17:
FIG. 17 is a schematic diagram of another example of a display interface of a terminal according to an embodiment of this application.

It should be emphasized that, if the terminal currently displays the desktop of the terminal, even if the application recently run by the terminal and not closed includes only the first application, the terminal can only display, in response to the pressing operation of the user on the side edge, the first interface including a task window of the first application. For example, as shown in (b) in FIG. 5, when the mobile phone 100 currently displays the desktop 502 of the terminal, the mobile phone 100 may display, in response to the pressing operation of the user on the side edge, the first interface 503 shown in (c) in FIG. 5, but cannot display the first interface including a task window of an application task in the first application. For example, as shown in (b) in FIG. 13, when the mobile phone 100 currently displays the desktop 1302 of the terminal, the mobile phone 100 cannot display, in response to the pressing operation of the user on the side edge, the first interface 503 shown in (c) in FIG. 13, and can only display a first interface 1701 shown in FIG. 17.

It should be noted that, in this application, if the terminal currently does not display the desktop of the terminal, for example, the desktop shown in (b) in FIG. 13 or (b) in FIG. 5, but displays an interface of the first application (any application in the terminal) in the terminal, for example, an interface of the "Browser" application shown in (a) in FIG. 13, or an interface of the "WeChat" application shown in (a) in FIG. 5, the terminal may perform S1201 or S1202 in the second application scenario of this application, and display the corresponding first interface.

In this application, when the terminal currently displays the desktop of the terminal, the terminal may display, in response to the pressing operation of the user on the side edge, the first interface including a task window of one or more applications; and then the terminal may implement switching between applications in response to the sliding operation, where the pressing operation and the sliding operation are continuous operations of the finger without leaving the side edge. To be specific, according to this application, user operations in application switching can be reduced, human-machine interaction performance can be improved, and user experience can be improved.

In a fourth application scenario of this application, the terminal may determine, based on a position of the pressing operation on the side edge of the terminal, whether to display task windows of a plurality of applications in the first interface or display task windows of a plurality of application tasks in a first application.

Specifically, when the pressing operation is a pressing operation of the user in a first position on the side edge, the at least one task window in the first interface is a task window of one or more applications recently run by the terminal and not closed; or when the pressing operation is a pressing operation of the user in a second position on the side edge, the at least one task window in the first interface is a task window of one or more application tasks of the first application.

Figure 18:
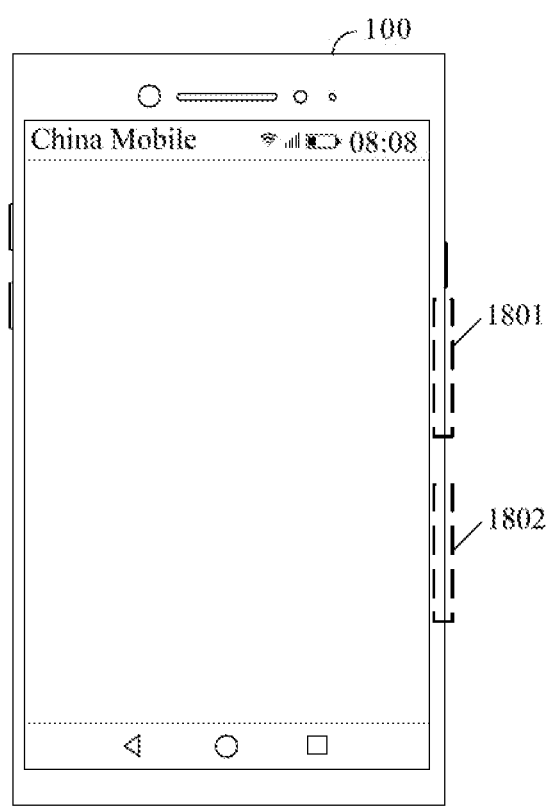
FIG. 18 is a schematic diagram of another example of a first position and a second position on a side edge of a terminal according to an embodiment of this application.

It should be noted that, the first position and the second position in this application may be two different positions on a same side edge of the terminal. For example, as shown in FIG. 18, a first position 1801 and a second position 1802 may be two different positions on the right side edge of the mobile phone 100. Alternatively, the first position and the second position may be located on two different side edges of the terminal. For example, as shown in FIG. 19, a first position 1901 may be located on the right side edge of the mobile phone 100, and a second position may be located on the upper side edge of the mobile phone 100.

Figure 20:
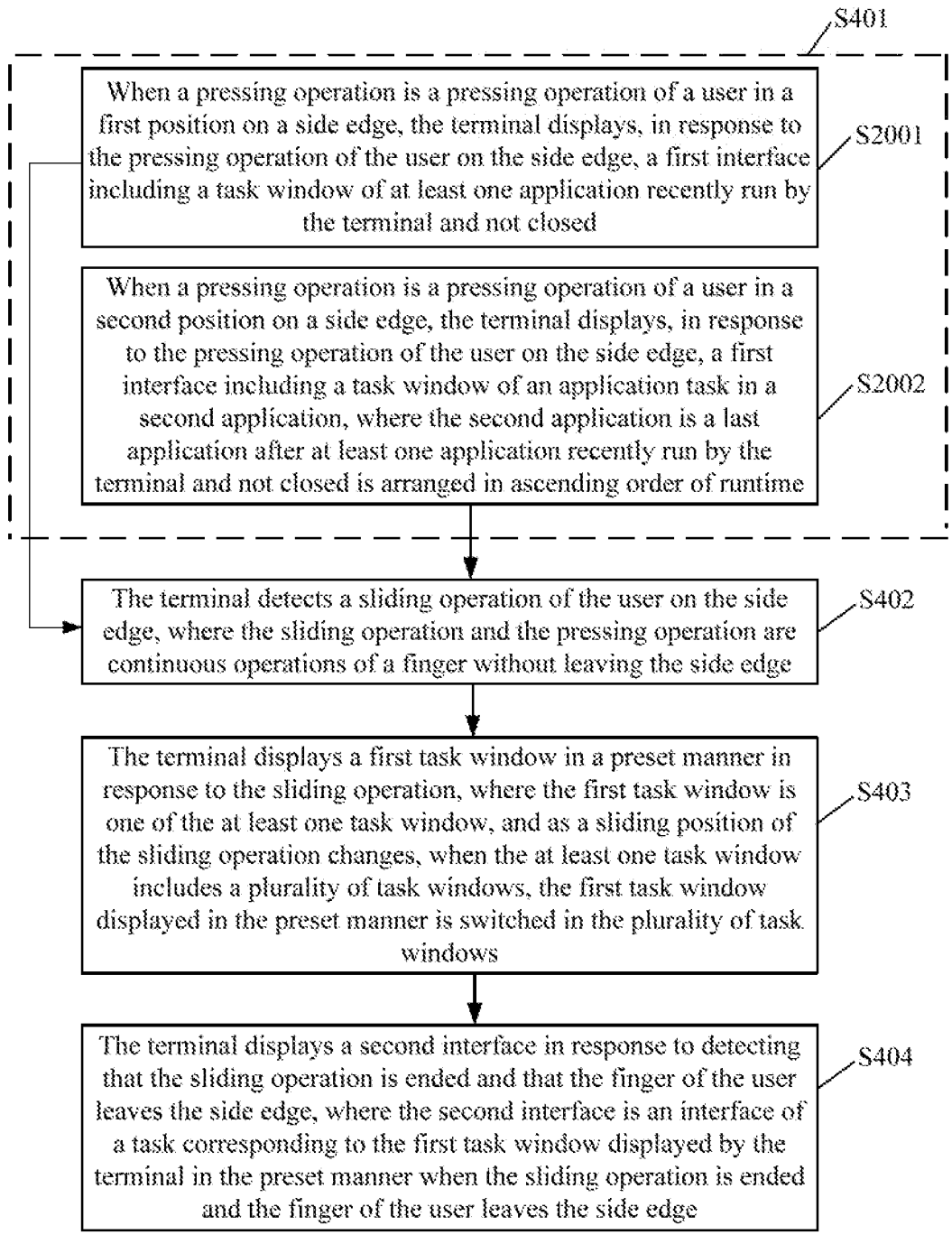
FIG. 20 is a flowchart of another task switching method according to an embodiment of this application.

Specifically, in the fourth application scenario, as shown in FIG. 20, S401 shown in FIG. 4 may include S2001.

S2001. When the pressing operation is a pressing operation of the user in a first position on the side edge, the terminal displays, in response to the pressing operation of the user on the side edge, the first interface including a task window of at least one application recently run by the terminal and not closed.

Figure 19:
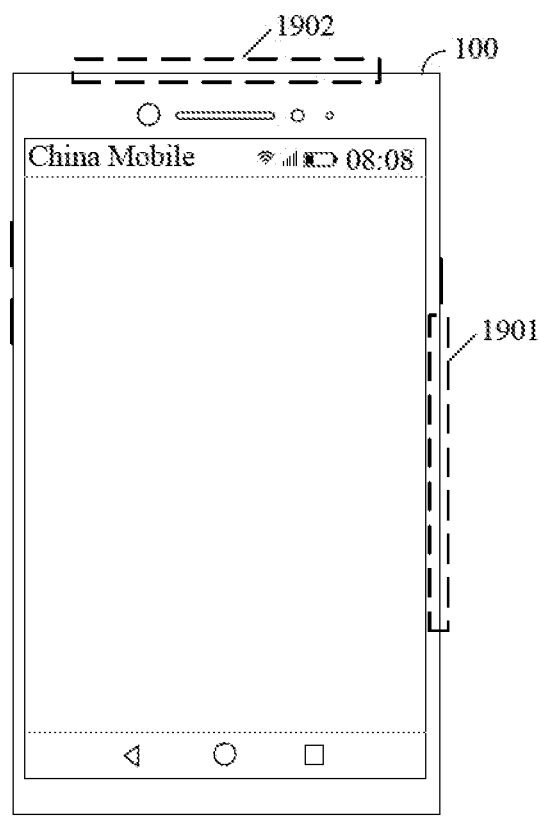
FIG. 19 is a schematic diagram of another example of a first position and a second position on a side edge of a terminal according to an embodiment of this application.

It may be understood that, as long as the terminal detects the pressing operation of the user in the first position on the side edge (for example, the first position 1901 on the right side edge shown in FIG. 19), regardless of whether the terminal is currently displaying an interface of any application in the terminal (for example, the interface 501 of the "WeChat" application shown in (a) in FIG. 5), or the terminal is currently displaying a desktop of the terminal (for example, the desktop 502 of the terminal shown in (b) in FIG. 5), and regardless of one or more applications recently run by the terminal and not closed, the terminal may display, in response to the pressing operation of the user on the side edge, the first interface (for example, the first interface 503 shown in (c) in FIG. 5) including the task window of the at least one application recently run by the terminal and not closed.

In the fourth application scenario, as shown in FIG. 20, S401 shown in FIG. 4 may further include S2002.

S2002. When the pressing operation is a pressing operation of the user in a second position on the side edge, the terminal displays, in response to the pressing operation of the user on the side edge, the first interface including a task window of an application task in a second application, where the second application is a last application after the at least one application recently run by the terminal and not closed is arranged in ascending order of runtime.

Figure 21:
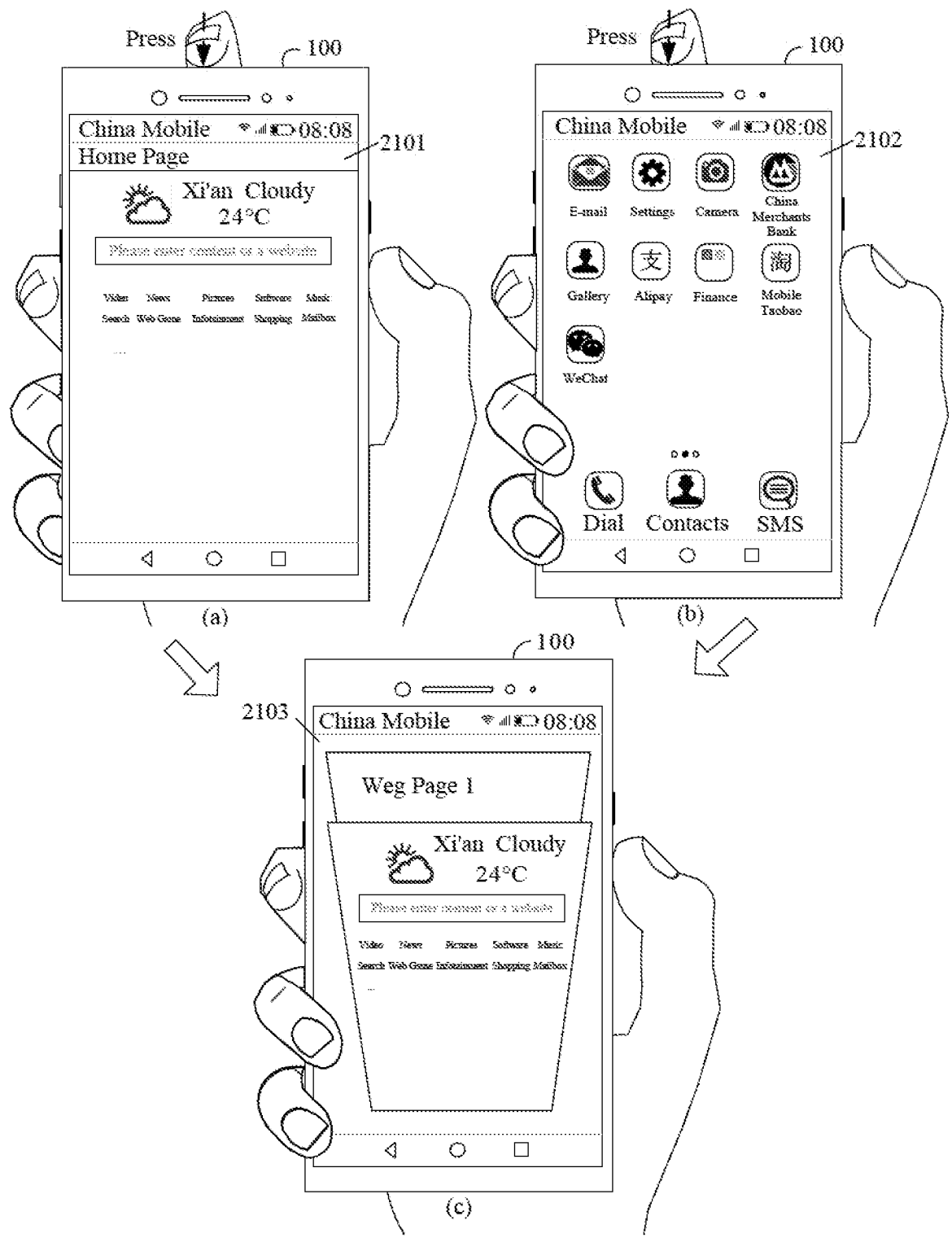
FIG. 21 is a schematic diagram of another example of a display interface of a terminal according to an embodiment of this application.

It may be understood that, as long as the terminal detects the pressing operation of the user in the second position on the side edge (for example, the second position 1902 on the upperside edge shown in FIG. 19), regardless of whether the terminal is currently displaying an interface of any application (for example, an interface 2101 of the "Browser" application shown in (a) in FIG. 21), or the terminal is currently displaying a desktop of the terminal (for example, a desktop 2102 of the terminal shown in (b) in FIG. 21), and regardless of one or more applications recently run by the terminal and not closed, the terminal may display, in response to the pressing operation of the user on the side edge, the first interface (for example, a first interface 2103 shown in (c) in FIG. 21) including the task window of the application task in the second application.

In a case, if the terminal is currently displaying an interface of an application, for example, the interface 2101 of the "Browser" application shown in (a) in FIG. 21, the application (such as the "Browser" application) currently being run by the terminal is the second application.

In another case, if the terminal is currently displaying the desktop of the terminal, such as the desktop 2102 of the terminal shown in (b) in FIG. 21, the second application is the last application after the at least one application recently run by the terminal and not closed is arranged in ascending order of runtime. For example, it is assumed that the at least one application recently run by the mobile phone 100 and not closed includes the "Browser" application, the "WeChat" application, and the "Settings" application, where recent runtime of the "Browser" application is 14:20 on Sep. 28, 2017, recent runtime of the "WeChat" application is 10:25 on Sep. 28, 2017, and recent runtime of the "Settings" application is 12:36 on Sep. 28, 2017. In this case, the second application is the "Browser" application.

In this application, the terminal may distinguish, based on the position of the pressing operation, whether the pressing operation is used to instruct the terminal to display a multi-task interface of a plurality of applications or display a multi-task interface of a plurality of application tasks of one application. In this way, the terminal can not only implement switching between applications in response to the pressing operation and the sliding operation that are continuous operations of the finger without leaving the side edge, but also implement switching between a plurality of application tasks in one application. To be specific, according to this application, user operations in switching between application tasks of one application can also be reduced, human-machine interaction performance can be improved, and user experience can be improved.

It may be understood that, to implement the foregoing functions, the terminal includes corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, functional modules in the terminal or the like may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in the embodiments of the present invention, module division is an example, and is merely logical function division. In actual implementation, another division manner may be used.

When each functional module is defined in a correspondence to each function, this application provides a task switching apparatus, where the task switching apparatus is included in a terminal provided in this application, and the task switching apparatus includes a detection unit 2201, a processing unit 2202, and a display unit 2203.

The detection unit 2201 is configured to support the task switching apparatus in performing "detecting the pressing operation of the user on the side edge" in S401 and S401a, "detecting that the sliding operation is ended and that the finger of the user leaves the side edge" in S402 and S404, "detecting the pressing operation of the user in the first position on the side edge" in S2201, and "detecting the pressing operation of the user in the second position on the side edge" in S2202 in the foregoing method embodiments, and/or is used in other processes of the technology described in this specification.

The processing unit 2202 is configured to support the task switching apparatus in running at least one task, where the at least one task may be at last one application recently run and not closed, or at least one application task in the first application or the second application.

The display unit 2203 is configured to support the task switching apparatus in performing S401, S401a, S403, S404, S1201, S1202, S1601, S2001, and S2002 in the foregoing method embodiments, and/or is used in other processes of the technology described in this specification.

Further, the task switching apparatus may further include a storage unit. The storage unit is configured to support the task switching apparatus in storing data related to the first interface and the second interface in the method embodiments, and/or is used in other processes of the technology described in this specification.

Figure 22:
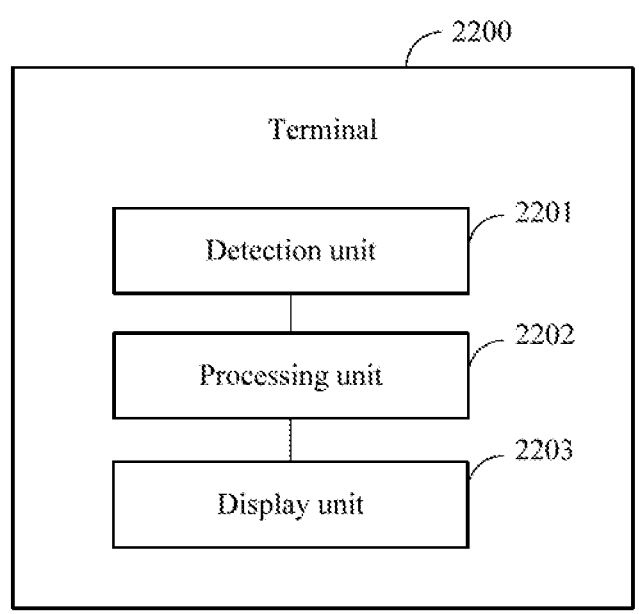
FIG. 22 is a schematic structural diagram of a terminal according to an embodiment of this application.

The task switching apparatus may be included in a terminal provided in this application. To be specific, this application provides a terminal. FIG. 22 is a possible schematic structural diagram of a terminal in the foregoing embodiment. The terminal 2200 includes a detection unit 2201, a processing unit 2202, and a display unit 2203.

For the method steps performed by the terminal with the support of the detection unit 2201, the processing unit 2202, and the display unit 2203, refer to the detailed descriptions about the method steps performed by the task switching apparatus with the support of each functional unit in the task switching apparatus in this application. Details are not described again herein in this application.

Further, the terminal 2200 may further include a storage unit. For the method steps performed by the terminal with the support of the storage unit, refer to the detailed descriptions about the method steps performed by the task switching apparatus with the support of the storage unit in the task switching apparatus in this application. Details are not described again herein in this application.

All related content of steps in the foregoing method embodiments may be cited in function descriptions of corresponding functional modules. Details are not described again herein.

Certainly, the task switching apparatus and the terminal 2200 include but are not limited to the units and modules illustrated above. For example, the terminal 2200 may further include a communications unit, where the communications unit is configured to communicate with another terminal. In addition, functions that the functional units can specifically implement include but are not limited to the functions corresponding to the method steps in the foregoing examples. For detailed descriptions about other units of the terminal 2200, refer to the detailed descriptions about the method steps corresponding to the units. Details are not described again herein in this embodiment of this application.

When an integrated unit is used, the detection unit 2201, the processing unit 2202, and the like may be integrated in a processing module for implementation; the communications unit may be an RF circuit, a Wi-Fi module, or a Bluetooth module of the terminal; the storage unit may be a storage module of the terminal; and the display unit 2203 may be a display module, for example, a touchscreen.

Figure 23:
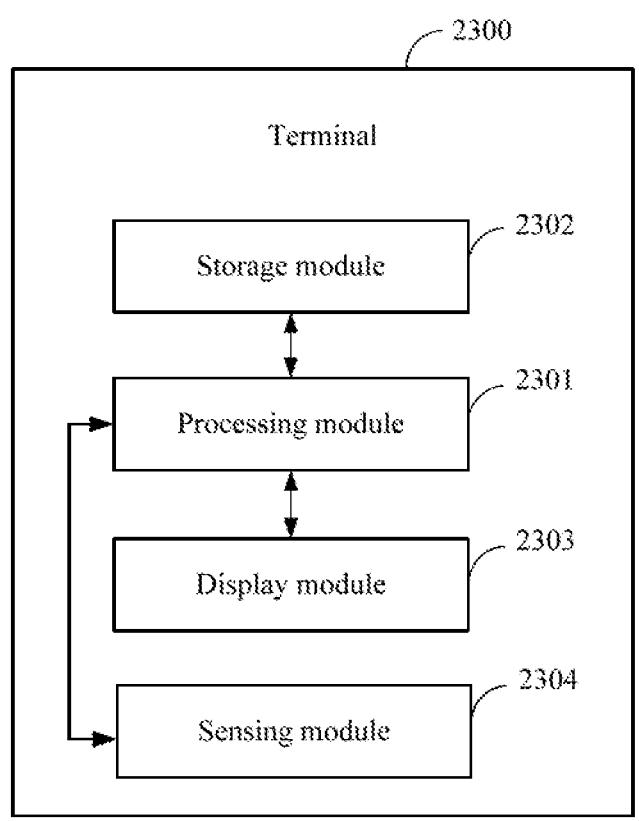
FIG. 23 is a schematic structural diagram of another terminal according to an embodiment of this application.

FIG. 23 is a possible schematic structural diagram of a terminal in the foregoing embodiment. The terminal 2300 includes a processing module 2301, a storage module 2302, a display module 2303, and a sensing module 2304. The sensing module 2304 is configured to detect a pressing operation and a sliding operation of a user on a side edge of the terminal. The processing module 2301 is configured to control and manage a user operation detected by the sensing module 2304. The display module 2303 is configured to display an image generated by the processing module 2301. The storage module 2302 is configured to store program code and data of the terminal.

Further, the terminal 2300 may further include a communications module. The communications module is configured to communicate with another terminal. For example, the communications module is configured to perform voice communication with another terminal, and receive a profile picture from or send a profile picture to the another terminal.

The processing module 2301 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module may be a transceiver, a transceiver circuit, a communications interface, or the like. The storage module 2302 may be a memory. The sensing module 2304 may be a sensor.

When the processing module 2301 is a processor (such as the processor 201 shown in FIG. 2), and the communications module is an RF circuit (such as the radio frequency circuit 202 shown in FIG. 2), and the storage module 2302 is a memory (such as the memory 203 shown in FIG. 2), and the display module 2303 is a touchscreen (including the touchpad 204-1 and the display 204-2 shown in FIG. 2), and the sensing module 2304 is a sensor (such as the sensor 206 shown in FIG. 2), the terminal provided in this application may be the mobile phone 100 shown in FIG. 2. The communications modules may include not only the RF circuit, but also the Wi-Fi module and the Bluetooth module. The communications modules such as the RF circuit, the Wi-Fi module, and the Bluetooth module may be collectively referred to as a communications interface. The processor, the communications interface, the touchscreen, and the memory may be coupled together by using a bus.

Referring to any one of FIG. 5 to FIG. 11(*b*), FIG. 13 to FIG. 15, FIG. 17, and FIG. 21, an embodiment of this application further provides a graphical user interface (GUI), where the graphical user interface is stored in a terminal. The terminal includes a touchscreen, a memory, a processor, and a sensor installed on a side edge of the terminal, where the sensor is configured to detect an operation of a user on the side edge, and the processor is configured to execute one or more computer programs stored in the memory.

Figure 9:
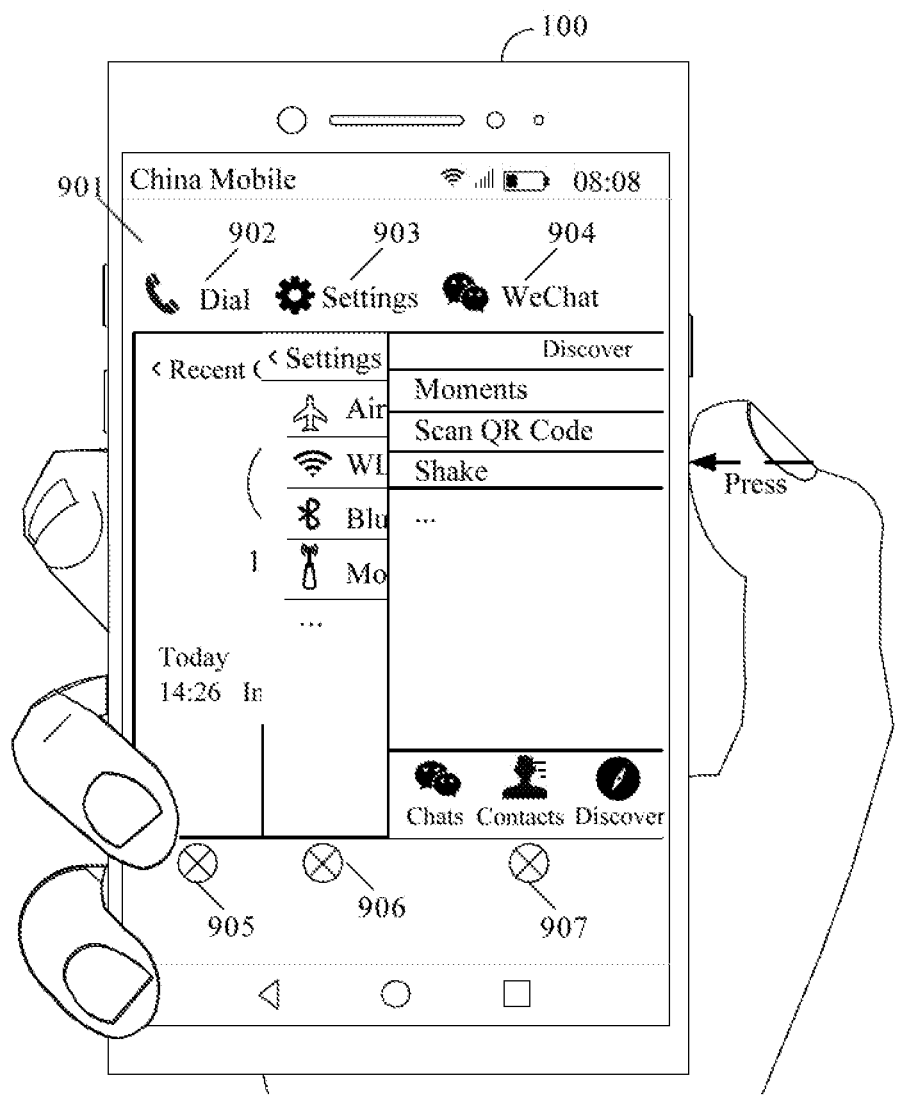
FIG. 9 is a schematic diagram of another example of a display interface of a terminal according to an embodiment of this application.

Specifically, in a first application scenario of this application, the graphical user interface includes:

a first GUI displayed on the touchscreen in response to a pressing operation on the side edge, as shown in any one of (c) in FIG. 5, FIG. 9, FIG. 10. FIG. 11(*a*), (*c*) in FIG. 13, or (c) in FIG. 15, where the first GUI includes a first interface, the first interface includes at least one task window, and the at least one task window corresponds to at least one task recently run by the processor and not closed;

a second GUI displayed on the touchscreen in response to a sliding operation on the side edge, as shown in any one of (d) in FIG. 5, FIG. 6, or FIG. 11(*b*), where the sliding operation and the pressing operation are continuous operations of a finger of the user without leaving the side edge, a first task window is displayed in the second GUI in a preset manner, the first task window is one of the at least one task window, and as a sliding position of the sliding operation changes, when the at least one task window includes a plurality of task windows, the first task window displayed in the second GUI in the preset manner is switched in the plurality of task windows; and a third GUI displayed on the touchscreen in response to ending the sliding operation and leaving the side edge by the finger of the user, as shown in (b) in any one of FIG. 7, FIG. 8, or FIG. 14, where the third GUI includes a second interface, and the second interface is an interface of a task corresponding to the first task window displayed in the second GUI in the preset manner as shown in (a) in FIG. 7, FIG. 8, or FIG. 14 when the sliding operation is ended and the finger of the user leaves the side edge.

In a possible implementation, the first task window in the second GUI is a task window of one of at least one application recently run by the processor and not closed; and the second interface in the third GUI is an interface of an application corresponding to the first task window displayed in the second GUI in the preset manner when the sliding operation is ended and the finger of the user leaves the side edge.

In another possible implementation, the first interface in the first GUI specifically includes task windows of at least two applications recently run by the processor and not closed. As shown in any one of (d) in FIG. 5, FIG. 6, or FIG. 11(*b*), the first task window in the second GUI is a task window of one of the at least two applications. The second interface in the third GUI is an interface of an application corresponding to the first task window displayed in the second GUI in the preset manner when the sliding operation is ended and the finger of the user leaves the side edge.

For example, as shown in any one of (c) in FIG. 5, FIG. 9, FIG. 10, or FIG. 11(*a*), the first interface in the first GUI specifically includes the task windows of the at least two applications recently run by the processor and not closed. As shown in any one of (d) in FIG. 5, FIG. 6, or FIG. 11(*b*), the first task window in the second GUI is a task window of one of the at least two applications. As shown in (b) in FIG. 7 or FIG. 8, the second interface in the third GUI is the interface of the application corresponding to the first task window displayed in the second GUI in the preset manner as shown in (a) in a corresponding drawing of FIG. 7 or FIG. 8 when the sliding operation is ended and the finger of the user leaves the side edge.

In another possible implementation, when an application recently run by the processor and not closed includes only a first application, the first interface in the first GUI is specifically the first interface including a task window of one or more application tasks in the first application, and the first application is any application in the terminal, where the first task window in the second GUI is a task window of an application task in the first application; and the second interface in the third GUI is an interface of an application task corresponding to the first task window displayed in the second GUI in the preset manner when the sliding operation is ended and the finger of the user leaves the side edge.

For example, as shown in (c) in FIG. 13, the first interface in the first GUI is specifically the first interface including a task window of one or more application tasks in the first application, and the first application is any application in the terminal. As shown in (d) in FIG. 13, the first task window in the second GUI is a task window of an application task in the first application. As shown (b) in FIG. 14, the second interface in the third GUI is an interface of an application task corresponding to the first task window displayed in the second GUI in the preset manner as shown in (a) in FIG. 14 when the sliding operation is ended and the finger of the user leaves the side edge.

In another possible implementation, when the touchscreen displays a desktop of the terminal, the first interface in the first GUI displayed on the touchscreen in response to the pressing operation on the side edge includes a task window of the at least one application recently run by the processor and not closed, where the first task window in the second GUI is the task window of the one of the at least one application recently run by the terminal and not closed; and the second interface in the third GUI is the interface of the application corresponding to the first task window displayed in the second GUI in the preset manner when the sliding operation is ended and the finger of the user leaves the side edge.

For example, as shown in (b) in FIG. 5, when the mobile phone 100 currently displays the desktop 502 of the terminal, the first GUI includes the first interface including the task window of the at least one application recently run by the processor and not closed as shown in (c) in FIG. 5. Correspondingly, as shown in (b) in FIG. 7 or FIG. 8, the second interface in the third GUI is the interface of the application corresponding to the first task window displayed in the second GUI in the preset manner as shown in (a) in a corresponding drawing of FIG. 7 or FIG. 8 when the sliding operation is ended and the finger of the user leaves the side edge.

In another possible implementation, the first interface in the first GUI displayed on the touchscreen in response to a pressing operation in a first position on the side edge includes the task window of the at least one application recently run by the terminal and not closed.

For example, assuming that the first position is the first position 1901 on the right side edge shown in FIG. 19, the first GUI includes the first interface of the task window of the at least one application recently run by the processor and not closed as shown in (c) in FIG. 5. Correspondingly, as shown in (b) in FIG. 7 or FIG. 8, the second interface in the third GUI is the interface of the application corresponding to the first task window displayed in the second GUI in the preset manner as shown in (a) in a corresponding drawing of FIG. 7 or FIG. 8 when the sliding operation is ended and the finger of the user leaves the side edge.

In another possible implementation, the first interface in the first GUI displayed on the touchscreen in response to a pressing operation in a second position on the side edge includes a task window of an application task in a second application, where the second application is a last application after the at least one application recently run by the touchscreen and not closed is arranged in ascending order of runtime, where the first task window in the second GUI is a task window of an application task in the second application; and the second interface in the third GUI is an interface of an application task corresponding to the first task window displayed in the second GUI in the preset manner when the sliding operation is ended and the finger of the user leaves the side edge.

For example, assuming that the second position is the second position 1902 on the right side edge shown in FIG. 19, as shown in (c) in FIG. 21, the first interface in the first GUI is specifically the first interface including a task window of one or more application tasks in the first application, and the first application is any application in the terminal. As shown in (d) in FIG. 13, the first task window in the second GUI is a task window of an application task in the first application. As shown (b) in FIG. 14, the second interface in the third GUI is an interface of an application task corresponding to the first task window displayed in the second GUI in the preset manner as shown in (a) in FIG. 14 when the sliding operation is ended and the finger of the user leaves the side edge.

This application further provides a computer storage medium, where the computer storage medium stores computer program code, and when the foregoing processor executes the computer program code, the terminal performs related method steps in any one of FIG. 4, FIG. 12, FIG. 16, and FIG. 20 to implement the task switching method in the foregoing embodiment.

This application further provides a computer program product, where when the computer program product is run on a computer, the computer is enabled to perform related method steps in any one of FIG. 4, FIG. 12, FIG. 16, and FIG. 20 to implement the task switching method in the foregoing embodiment.

The terminal 2200, the terminal 2300, the computer storage medium, and the computer program product provided in this application are all configured to perform the corresponding methods provided above. Therefore, for beneficial effects that the terminals, the computer storage medium, and the computer program product can achieve, refer to beneficial effects in the corresponding methods provided above. Details are not described again herein.

The foregoing descriptions about implementations allow a person skilled in the art to clearly understand that, for the purpose of convenient and brief description, division of the foregoing functional modules is used only as an example for illustration. In actual application, the foregoing functions can be allocated to different modules and implemented based on a requirement, that is, an internal structure of an apparatus is divided into different functional modules to implement all or some of the functions described above. For a detailed working process of the foregoing system, apparatus, and unit, refer to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a computer software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A task switching method, applied to a terminal, wherein a sensor is installed on a side edge of the terminal, the sensor is configured to detect an operation of a user on the side edge, and the method comprises:
    displaying, by the terminal, a first interface in response to a pressing operation of the user on the side edge, wherein the first interface comprises at least one task window, and the at least one task window corresponds to at least one task recently run by the terminal and not closed;
    detecting, by the terminal, a sliding operation of the user on the side edge, wherein the sliding operation and the pressing operation are continuous operations of a finger of the user without leaving the side edge;
    displaying, by the terminal, a first task window in a preset manner in response to the sliding operation, wherein the first task window is one of the at least one task window, and as a sliding position of the sliding operation changes, when the at least one task window comprises a plurality of task windows, the first task window displayed in the preset manner is switched in the plurality of task windows; and
    displaying, by the terminal, a second interface in response to detecting that the sliding operation is ended and that the finger of the user leaves the side edge, wherein the second interface is an interface of a task corresponding to the first task window displayed by the terminal in the preset manner when the sliding operation is ended and the finger of the user leaves the side edge.

2. The method according to claim 1, wherein the at least one task recently run by the terminal and not closed comprises at least one application recently run by the terminal and not closed;
    the first task window is a task window of one of the at least one application recently run by the terminal and not closed; and
    the second interface is an interface of an application corresponding to the first task window displayed by the terminal in the preset manner when the sliding operation is ended and the finger of the user leaves the side edge.

3. The method according to claim 1, wherein the displaying, by the terminal, a first interface in response to a pressing operation of the user on the side edge comprises:
    when there are at least two applications recently run by the terminal and not closed, displaying, by the terminal in response to the pressing operation of the user on the side edge, the first interface comprising task windows of the at least two applications, wherein the first task window is a task window of one of the at least two applications; and
    the second interface is an interface of an application corresponding to the first task window displayed by the terminal in the preset manner when the sliding operation is ended and the finger of the user leaves the side edge.

4. The method according to claim 1, wherein the displaying, by the terminal, a first interface in response to a pressing operation of the user on the side edge comprises:
    when there is only a first application recently run by the terminal and not closed, displaying, by the terminal in response to the pressing operation of the user on the side edge, the first interface comprising a task window of one or more application tasks in the first application, wherein the first application is any application in the terminal, wherein
    the first task window is a task window of an application task in the first application; and
    the second interface is an interface of an application task corresponding to the first task window displayed by the terminal in the preset manner when the sliding operation is ended and the finger of the user leaves the side edge.

5. The method according to claim 1, wherein the displaying, by the terminal, a first interface in response to a pressing operation of the user on the side edge comprises:
    when the terminal currently displays a desktop of the terminal, displaying, by the terminal in response to the pressing operation of the user on the side edge, the first interface comprising a task window of the at least one application recently run by the terminal and not closed.

6. The method according to claim 1, wherein the pressing operation is a pressing operation of the user in a first position on the side edge.

7. The method according to claim 6, wherein the displaying, by the terminal, a first interface in response to a pressing operation of the user on the side edge comprises:
    when the pressing operation is a pressing operation of the user in a second position on the side edge, displaying, by the terminal in response to the pressing operation of the user on the side edge, the first interface comprising a task window of an application task in a second application, wherein the second application is a last application after the at least one application recently run by the terminal and not closed is arranged in ascending order of runtime, wherein
    the first task window is a task window of an application task in the second application; and
    the second interface is an interface of an application task corresponding to the first task window displayed by the terminal in the preset manner when the sliding operation is ended and the finger of the user leaves the side edge.

8. The method according to claim 1, wherein the side edge comprises a left side edge of the terminal and/or a right side edge of the terminal.

9. The method according to claim 1, wherein the displaying, by the terminal, a first interface in response to a pressing operation of the user on the side edge comprises:
    displaying, by the terminal, the first interface in response to a pressing operation of the user on at least two points of the side edge.

10. A terminal, wherein the terminal comprises a processor, a memory, a touchscreen, and a sensor installed on a side edge of the terminal, the memory, the touchscreen, and the sensor are coupled to the processor, the memory is configured to store computer program code, the computer program code comprises a computer instruction, and when the processor executes the computer instruction, the sensor is configured to detect a pressing operation of a user on the side edge;

the processor is further configured to run at least one task in the terminal, where data of the at least one task is stored in the memory;

the touchscreen is configured to display a first interface in response to the pressing operation detected by the sensor, wherein the first interface comprises at least one task window, and the at least one task window corresponds to at least one task recently run by the processor and not closed;

the sensor is further configured to detect a sliding operation of the user on the side edge, wherein the sliding operation and the pressing operation are continuous operations of a finger of the user without leaving the side edge;

the touchscreen is further configured to display a first task window in a preset manner in response to the sliding operation detected by the sensor, wherein the first task window is one of the at least one task window, and as a sliding position of the sliding operation changes, when the at least one task window comprises a plurality of task windows, the first task window displayed in the preset manner is switched in the plurality of task windows;

the sensor is further configured to detect that the sliding operation is ended and that the finger of the user leaves the side edge; and the touchscreen is further configured to display a second interface in response to detecting, by the sensor, that the sliding operation is ended and that the finger of the user leaves the side edge, wherein the second interface is an interface of a task corresponding to the first task window displayed by the touchscreen in the preset manner when the sliding operation is ended and the finger of the user leaves the side edge.

11. The terminal according to claim 10, wherein the at least one task recently run by the processor and not closed comprises at least one application recently run by the processor and not closed;

the first task window displayed by the touchscreen is a task window of one of the at least one application recently run by the processor and not closed; and the second interface displayed by the touchscreen is an interface of an application corresponding to the first task window displayed by the touchscreen in the preset manner when the sensor detects that the sliding operation is ended and that the finger of the user leaves the side edge.

12. The terminal according to claim 10, wherein the touchscreen is configured to:

when there are at least two applications recently run by the processor and not closed, display, in response to the pressing operation detected by the sensor, the first interface comprising task windows of the at least two applications, wherein the first task window displayed by the touchscreen is a task window of one of the at least two applications; and the second interface displayed by the touchscreen is an interface of an application corresponding to the first task window displayed by the touchscreen in the preset manner when the sensor detects that the sliding operation is ended and that the finger of the user leaves the side edge.

13. The terminal according to claim 10, wherein the touchscreen is configured to:

when an application recently run by the processor and not closed comprises only a first application, display, in response to the pressing operation detected by the sensor, the first interface comprising a task window of one or more application tasks in the first application, wherein the first application is any application in the terminal, wherein the first task window displayed by the touchscreen is a task window of an application task in the first application; and the second interface displayed by the touchscreen is an interface of an application task corresponding to the first task window displayed by the touchscreen in the preset manner when the sliding operation is ended and the finger of the user leaves the side edge.

14. The terminal according to claim 10, wherein the touchscreen is configured to:

when the touchscreen currently displays a desktop of the terminal, display, in response to the pressing operation detected by the sensor, the first interface comprising a task window of the at least one application recently run by the processor and not closed, wherein the first task window displayed by the touchscreen is the task window of the one of the at least one application recently run by the terminal and not closed; and the second interface displayed by the touchscreen is the interface of the application corresponding to the first task window displayed by the touchscreen in the preset manner when the sliding operation is ended and the finger of the user leaves the side edge.

15. The terminal according to claim 10, wherein the pressing operation detected by the sensor is a pressing operation of the user in a first position on the side edge.

16. The terminal according to claim 15, wherein the touchscreen is configured to:

when the pressing operation is a pressing operation of the user in a second position on the side edge, display, in response to the pressing operation detected by the sensor, the first interface comprising a task window of an application task in a second application, wherein the second application is a last application after the at least one application recently run by the processor and not closed is arranged in ascending order of runtime, wherein the first task window displayed by the touchscreen is a task window of an application task in the second application; and the second interface displayed by the touchscreen is an interface of an application task corresponding to the first task window displayed by the touchscreen in the preset manner when the sliding operation is ended and the finger of the user leaves the side edge.

17. The terminal according to claim 10, wherein the side edge comprises a left side edge of the terminal and/or a right side edge of the terminal.

18. The terminal according to claim 10, wherein the touchscreen is configured to:

display the first interface in response to a pressing operation that is of the user on at least two points of the side edge and is detected by the sensor.

19. A non-volatile computer storage medium, comprising a computer instruction, wherein when the computer instruction is run on a terminal, the terminal is enabled to perform the task switching method according to claim 1.

* * * * *